(12) United States Patent
Misra et al.

(10) Patent No.: US 11,170,349 B2
(45) Date of Patent: Nov. 9, 2021

(54) SYSTEMS AND METHODS FOR DYNAMICALLY PROVIDING BEHAVIORAL INSIGHTS AND MEETING GUIDANCE

(71) Applicants: Raghavendra Misra, Ponte Vedra, FL (US); Rohan Misra, Ponte Vedra, FL (US)

(72) Inventors: Raghavendra Misra, Ponte Vedra, FL (US); Rohan Misra, Ponte Vedra, FL (US)

(*) Notice: Subject to any disclaimer, the term of this patent is extended or adjusted under 35 U.S.C. 154(b) by 0 days.

(21) Appl. No.: 17/000,230

(22) Filed: Aug. 21, 2020

(65) Prior Publication Data

US 2021/0056515 A1    Feb. 25, 2021

Related U.S. Application Data

(60) Provisional application No. 62/890,526, filed on Aug. 22, 2019, provisional application No. 62/890,540, filed on Aug. 22, 2019, provisional application No. 62/890,552, filed on Aug. 22, 2019.

(51) Int. Cl.
| | |
|---|---|
| *G06Q 10/10* | (2012.01) |
| *G06F 3/14* | (2006.01) |
| *G06Q 30/02* | (2012.01) |
| *G09B 19/00* | (2006.01) |
| *G06Q 10/06* | (2012.01) |

(52) U.S. Cl.
CPC .......... *G06Q 10/1095* (2013.01); *G06F 3/14* (2013.01); *G06Q 10/063114* (2013.01); *G06Q 10/103* (2013.01); *G06Q 30/0282* (2013.01); *G09B 19/00* (2013.01)

(58) Field of Classification Search
CPC .............. G06Q 10/00; G06Q 10/1095; G06Q 10/063114; G06Q 10/103; G06Q 30/0282; G06F 3/14; G09B 19/00
USPC ...................................................... 705/7.19
See application file for complete search history.

(56) References Cited

U.S. PATENT DOCUMENTS

| | | | |
|---|---|---|---|
| 9,030,570 B2 * | 5/2015 | Kido .................. | G06K 9/38 348/222.1 |
| 9,230,228 B2 * | 1/2016 | Ryan .............. | G06Q 10/063116 |
| 9,674,243 B2 * | 6/2017 | Bader-Natal ........ | H04L 65/1093 |
| 10,218,588 B1 * | 2/2019 | Brisebois .............. | H04L 65/403 |
| 2007/0112926 A1 * | 5/2007 | Brett .................... | G06Q 10/109 709/206 |
| 2008/0133282 A1 * | 6/2008 | Landar ............... | G06Q 10/1095 705/5 |

(Continued)

OTHER PUBLICATIONS

Steve "The Three Insights Within Your Core Values Index Psychometric Profile", Jun. 2019, Product Development, eRep, Inc. Posted : pp. 1-6 (Year: 2019).*

*Primary Examiner* — Romain Jeanty
(74) *Attorney, Agent, or Firm* — Wilson Dutra, PLLC; Camille A. Wilson

(57) ABSTRACT

The present disclosure relates to a more effective way to prepare for meetings and events. Accordingly, the present disclosure providing systems and methods for generating and presenting behavioral insights for individuals and groups that may facilitate preparation for meetings. In some implementations, the system may inform the proposed group what each individual might need before a meeting. In some aspects, the system may suggest what might make a meeting effective based on the behavioral insights of the attendees.

16 Claims, 29 Drawing Sheets

(56) References Cited

U.S. PATENT DOCUMENTS

| | | | |
|---|---|---|---|
| 2009/0100032 A1* | 4/2009 | Jones | G06F 16/9535 |
| 2012/0102050 A1* | 4/2012 | Button | G06F 16/9535 |
| | | | 707/749 |
| 2013/0004930 A1* | 1/2013 | Sorenson | G09B 7/02 |
| | | | 434/350 |
| 2013/0006685 A1* | 1/2013 | Kelkar | G06Q 10/00 |
| | | | 705/7.11 |
| 2013/0211980 A1* | 8/2013 | Heiferman | G06Q 50/01 |
| | | | 705/30 |
| 2013/0282605 A1* | 10/2013 | Noelting | G06Q 10/10 |
| | | | 705/321 |
| 2013/0332241 A1* | 12/2013 | Taylor | G06F 16/283 |
| | | | 705/7.36 |
| 2014/0278658 A1* | 9/2014 | Straznitskas | G06Q 10/063118 |
| | | | 705/7.17 |
| 2014/0358586 A1* | 12/2014 | Patel | H04N 19/00 |
| | | | 705/3 |
| 2015/0026149 A1* | 1/2015 | Jones | G06Q 30/0224 |
| | | | 707/706 |
| 2015/0199746 A1* | 7/2015 | Hocking, Jr. | G06Q 40/06 |
| | | | 705/26.7 |
| 2015/0279227 A1* | 10/2015 | Huber | G09B 7/02 |
| | | | 434/353 |
| 2017/0316326 A1* | 11/2017 | Ricketts | G06Q 10/10 |
| 2018/0032967 A1* | 2/2018 | Barker | G06Q 10/063114 |
| 2018/0046957 A1* | 2/2018 | Yaari | G06Q 10/1095 |
| 2018/0082262 A1* | 3/2018 | Kathuria | G06Q 10/06398 |
| 2018/0107984 A1* | 4/2018 | Bender | G06Q 10/1093 |
| 2018/0143025 A1* | 5/2018 | Kurata | G08G 1/005 |
| 2018/0189743 A1* | 7/2018 | Balasubramanian | G06Q 10/1095 |
| 2018/0349858 A1* | 12/2018 | Walker | G06Q 10/1095 |
| 2018/0366021 A1* | 12/2018 | Zertuche | G09B 7/10 |
| 2019/0102802 A1* | 4/2019 | Tuschman | G06Q 30/0251 |
| 2019/0342107 A1* | 11/2019 | Vogel | H04L 12/1818 |

\* cited by examiner

FIG. 2A

| Team Member | Behavior Factors | Performance Keys | Communication Style |
|---|---|---|---|
| Employee A | Initiator, Spontaneous, Creative | Provide broad factors Encourage brainstorming | Move at fast pace Provide options Provide visuals |
| Employee B | Adaptor, Reserved, Anchored | Allow reflection time Keep it tangible | Provide logical steps Provde details |
| Employee C | | Need Information | |
| Employee D | | Need Information | |

FIG. 2B

Meeting details

| Name | Presentation Design | Information Type | Length of Content | Preparation |
|---|---|---|---|---|
| Employee A | Formal | Big Picture | Short | Pre-meeting materials/action items |
| Employee B | Relaxed | Detailed Instructions | Short but friendly | In-meeting bullet points, post-meeting summary materials for reference |
| Employee C | Formal | Big Picture | Long enough for questions | Pre-meeting materials/action items, In-meeting bullet points, post-meeting detailed materials for reference |
| Employee D | Relaxed | Big Picture | Short | In-meeting bullet points, post-meeting materials for reference |
| Employee E | Formal | Detailed Instructions | Long enough for questions | Pre-meeting materials/action items, In-meeting bullet points, post-meeting detailed materials for reference |

FIG. 4B

| Presentation Design | Formal |
|---|---|
| Length of Content | Long enough for questions, option to leave before |
| Tone of Meeting | Neutral, friendly beginning |
| Information Type | Detailed first then big picture (may lose interest from some employees) |
| Preparation | Pre-meeting materials/action items, In-meeting bullet points, post-meeting detailed materials for reference |

FIG. 6

SYSTEMS AND METHODS FOR DYNAMICALLY PROVIDING BEHAVIORAL INSIGHTS AND MEETING GUIDANCE

CROSS-REFERENCE TO RELATED APPLICATION

This application claims priority to and the full benefit of U.S. Provisional Patent Application Ser. No. 62/890,526, filed Aug. 22, 2019, and titled "SYSTEMS AND METHODS FOR DYNAMICALLY PROVIDING AND DEVELOPING BEHAVIORAL INSIGHTS FOR INDIVIDUALS AND GROUPS", U.S. Provisional Patent Application Ser. No. 62/890,540, filed Aug. 22, 2019, and titled "SYSTEMS AND METHODS FOR DYNAMICALLY PROVIDING BEHAVIORAL INSIGHTS AND MEETING GUIDANCE", and U.S. Provisional Patent Application Ser. No. 62/890,552, filed Aug. 22, 2019, and titled "SYSTEMS AND METHODS FOR DYNAMICALLY RECEIVING AND PROVIDING PERSONNEL REVIEW DATA BASED ON BEHAVIORAL INSIGHTS", the entire contents of which are incorporated in this application by reference

BACKGROUND OF THE DISCLOSURE

A natural byproduct of timekeeping was the development of the calendar, which streamlined keeping track of longer units of time such as days, weeks, months, or years. Though there are a variety of calendars currently in use, such as national or religious calendars, the Gregorian calendar has become the international standard used almost everywhere around the world. Calendars have expanded to include other records or devices for timekeeping, such as an appointment book or portable calendars. Calendaring software, for example, provides an electronic version of a calendar.

For the ease of its users, calendaring software have included other features that traditional calendars weren't able to have or were considered separate from the calendar itself. For example, calendaring software may include appointment books, contact lists, or address books. These were initially extended features offered by time management software, such as computer office automation systems. Calendaring software systems or applications are commonly integrated in office suites for personal computers or for smart phones.

Calendaring software can also go beyond individual use and be used as part of a networked package that allows users to share entries or invite other users to appointments on their personal calendars. Group functionality has become more predominant and is commonly used in the workplace. Though calendar software systems may include group calendar features or multiple calendars for a single individual, organizations regularly experiment with how to more effectively or efficiently integrate, sync, or use their calendars consistently. As digital calendars have expanded the features they offer, there is still a need for features that convey important information succinctly based on who receives a calendar invite.

SUMMARY OF THE DISCLOSURE

What is needed is a system and method for preparing calendar invitations and presenting relevant information regarding potential attendees. In some embodiments, the system may integrate with behavioral insights to provide relevant information for each calendar invitee. For example, in a work environment, each attendee may approach meetings differently. As a result, they have different needs for preparing for a meeting and different needs as to what makes a meeting effective for them.

The present disclosure relates to a more effective way to prepare for meetings and events. Accordingly, the present disclosure providing systems and methods for generating and presenting behavioral insights for individuals and groups that may facilitate preparation for meetings. In some implementations, the system may inform the proposed group what each individual might need before a meeting. In some aspects, the system may suggest what might make a meeting effective based on the behavioral insights of the attendees.

In some embodiments, a system of one or more computers may be configured to perform particular operations or actions by virtue of having software, firmware, hardware, or a combination installed on the system that in operation causes or cause the system to perform the actions. In some implementations, one or more computer programs may be configured to perform operations or actions by virtue of including instructions that, when executed by data processing apparatus, cause the apparatus to perform the actions. In some aspects, one general aspect of the present disclosure may comprise a method for providing a meeting interface. In some embodiments, the method may comprise transmitting a calendar prompt requesting at least one date and time for a meeting, transmitting an attendee prompt requesting at least one requested attendee for a meeting group, and transmitting a behavioral insight dashboard providing behavioral insights for one or more requested attendee of the meeting group, wherein behavior insights are based on at least an assessment of a psychometric profile of at least one attendee and the meeting group, wherein the meeting interface is accessible by a user. In some aspects, corresponding computer systems, apparatus, and computer programs recorded on one or more computer storage devices, each configured to perform the actions of the methods.

In some implementations, the behavioral insight dashboard is updated in real time as requested attendees are added to the meeting group. In some aspects, the behavioral insights provide guidance on how to effectively conduct the meeting based on predefined parameters. In some embodiments, the method may comprise recommending a change in a meeting group based on comparison. In some implementations, one or both of at least one date and time and at least one requested attendee are transmitted to the external calendaring system. In some aspects, compatible attendees increase the effectiveness of the meeting group. In some embodiments, the collaboration prompt invites the portion of the meeting group to provide meeting preparation information. In some implementations, the techniques may include hardware, a method, process, or computer software on a computer-accessible medium.

In some aspects, the present disclosure may comprise a method for providing a meeting interface. In some implementations, the method may comprise providing meeting information comprised of at least date information, time information, potential attendees, and confirmed attendees for a meeting; and providing a behavioral insight dashboard providing behavioral insights for one or more of the potential attendees or confirmed attendees, wherein behavior insights are based on at least an assessment of a psychometric profile of one or both the potential attendees and confirmed attendees, wherein the meeting interface is accessible by a user. In some embodiments, this may include corresponding computer systems, apparatus, and computer programs recorded on one or more computer storage devices, each configured to perform the actions of the methods.

In some implementations, the method may comprise suggesting an effective meeting style based on behavioral insights. In some embodiments, behavioral insights determine comprehension styles of confirmed attendees, and the effective meeting style is based at least in part on comprehension styles. In some aspects, the behavioral insight dashboard updates in real time as potential attendees and confirmed attendees change. In some embodiments, the described techniques may include hardware, a method or process, or computer software on a computer-accessible medium.

In some embodiments, the present disclosure may comprise a method for providing a meeting interface. In some implementations, the method may comprise providing a meeting dashboard of at least date information, time information, and a meeting group for a meeting, wherein the meeting group may comprise confirmed attendees; providing a behavioral insight dashboard providing behavioral insights for confirmed attendees of the meeting, wherein behavioral insights are based at least on an assessment of a psychometric profile of confirmed attendees and the meeting group; and providing a notes dashboard configured to aggregate meeting notes from at least a portion of confirmed attendees. In some aspects, this may include corresponding computer systems, apparatus, and computer programs recorded on one or more computer storage devices, each configured to perform the actions of the methods.

In some implementations, the method may comprise: receiving a set of meeting tasks, wherein the set of meeting tasks may comprise a task, a task team, and a due date; and transmitting the set of meeting tasks to at least a portion of the meeting group. In some embodiments, the method may comprise receiving task progress from at least a portion of the task team; and providing task progression based on received task progress. In some aspects, the method may comprise: integrating with an external task management platform; and transmitting the set of meeting tasks to the external task management platform. In some implementations, feedback relates to one or both of at least a portion of the meeting group or the meeting. In some embodiments, the method may comprise providing feedback to at least a portion of the meeting group. In some aspects, the method may comprise receiving a recording of the meeting; and providing the recording of the meeting to at least a portion of the meeting group. In some implementations, the method may comprise storing the recording with a calendar dashboard. In some aspects, the method may comprise transmitting aggregated notes to at least a portion of the meeting group. Implementations of the described techniques may include hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 2A illustrates exemplary behavioral insights for a team in illustration form, wherein the behavioral insights are based at least in part on psychometric profiles.

FIG. 2B illustrates exemplary behavioral insights for a team in text form, wherein the behavioral insights are based at least in part on psychometric profiles.

FIG. 4B illustrates exemplary behavioral insights for a team in text form, wherein the behavioral insights are based at least in part on psychometric invitees.

FIG. 6 illustrates exemplary behavioral insights and meeting strategy suggestions, according to some embodiments of the present disclosure.

DETAILED DESCRIPTION

The present disclosure relates to a more effective way to prepare for meetings and events. Accordingly, the present disclosure providing systems and methods for generating and presenting behavioral insights for individuals and groups that facilitate preparation for meetings. In some implementations, the system may inform the proposed group what each individual might need before a meeting. In some aspects, the system may suggest what might make a meeting effective based on the behavioral insights of the attendees.

In the following sections, detailed descriptions of examples and methods of the disclosure will be given. The description of both preferred and alternative examples though thorough are exemplary only, and it is understood that to those skilled in the art variations, modifications, and alterations may be apparent. It is therefore to be understood that the examples do not limit the broadness of the aspects of the underlying disclosure as defined by the claims.

Glossary

Behavioral Insight: as used herein refers to characteristics and attributes associated with a person, persons, or groups. In some embodiments, the characteristics and attributes may be a combination of psychometric profile, interests, talents, and skills, as non-limiting examples. In some aspects, behavioral insights may consider performance data, feedback data, historical data, user-generated data, or combinations thereof. In some aspects, the behavioral insight may be applied to business roles, personal roles, academic roles, or any other role where understanding behavior may be useful. For example, a life coach may use behavioral insights to inform how to coach a user. As another example, an employer may use behavioral insights to understand and improve team dynamics.

Psychometric Profile: as used herein refers to a set of psychometric attributes associated with a person, persons, or groups based on actual psychometric assessments, historical psychometric assessments associated with a demographic, implied psychometric attributes based on behavior, or combinations thereof.

Meeting: as used herein refers to any event with attendees. For example, a meeting may comprise a group of employees from a company, wherein the meeting may be hosted by a manager. As another example, a meeting may comprise a speaking engagement or conference.

Subject: as used herein refers to a person or group who is the subject of a psychometric profile, behavioral insights, feedback, or performance data, as non-limiting examples.

Figure 1A:
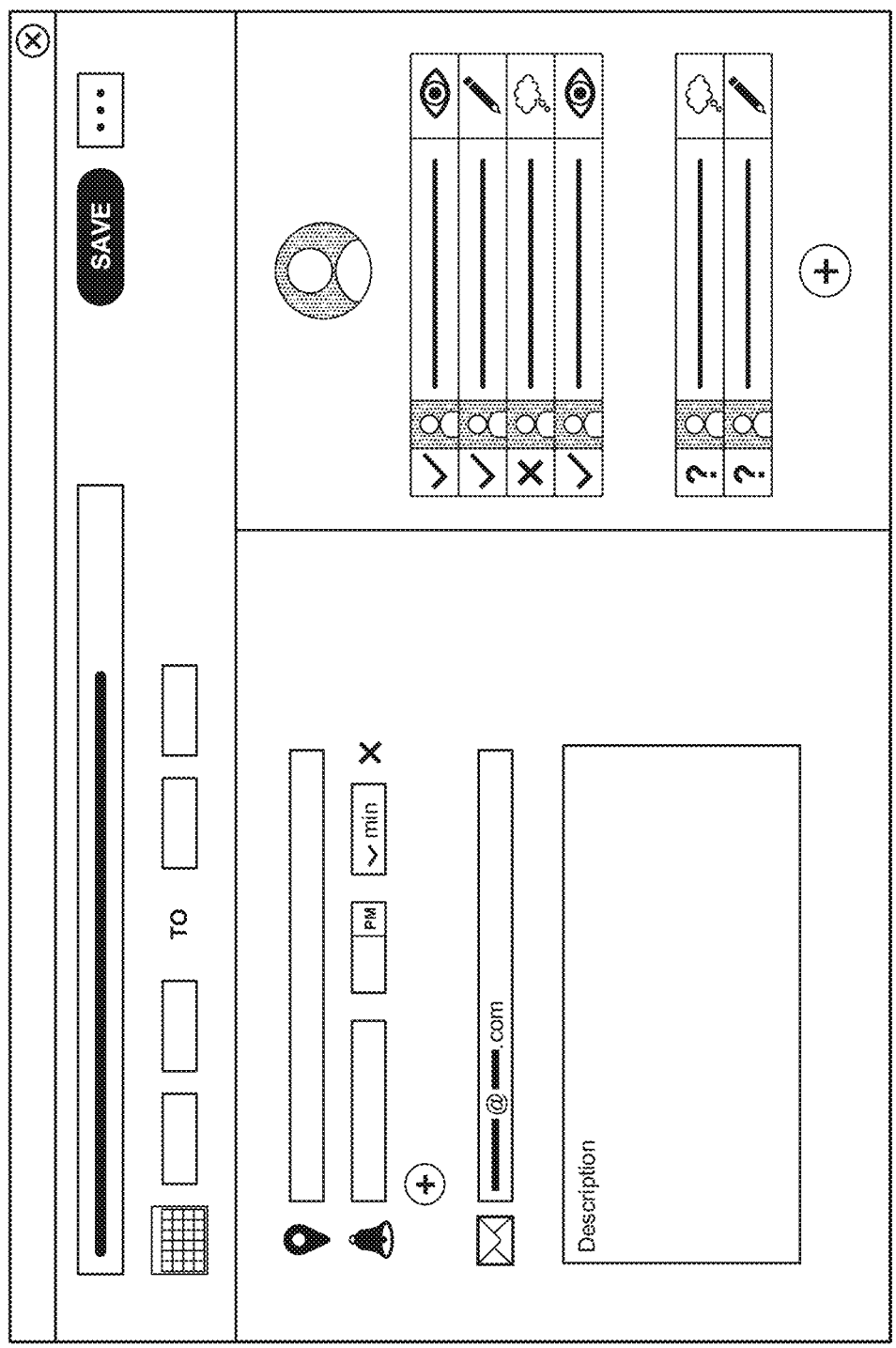
FIG. 1A illustrates an exemplary calendar meeting interface, according to some embodiments of the present disclosure.
Figure 1B:
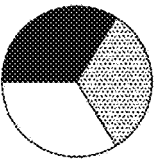
FIG. 1B illustrates an exemplary calendar meeting interface with behavioral insight details.
Figure 1C:
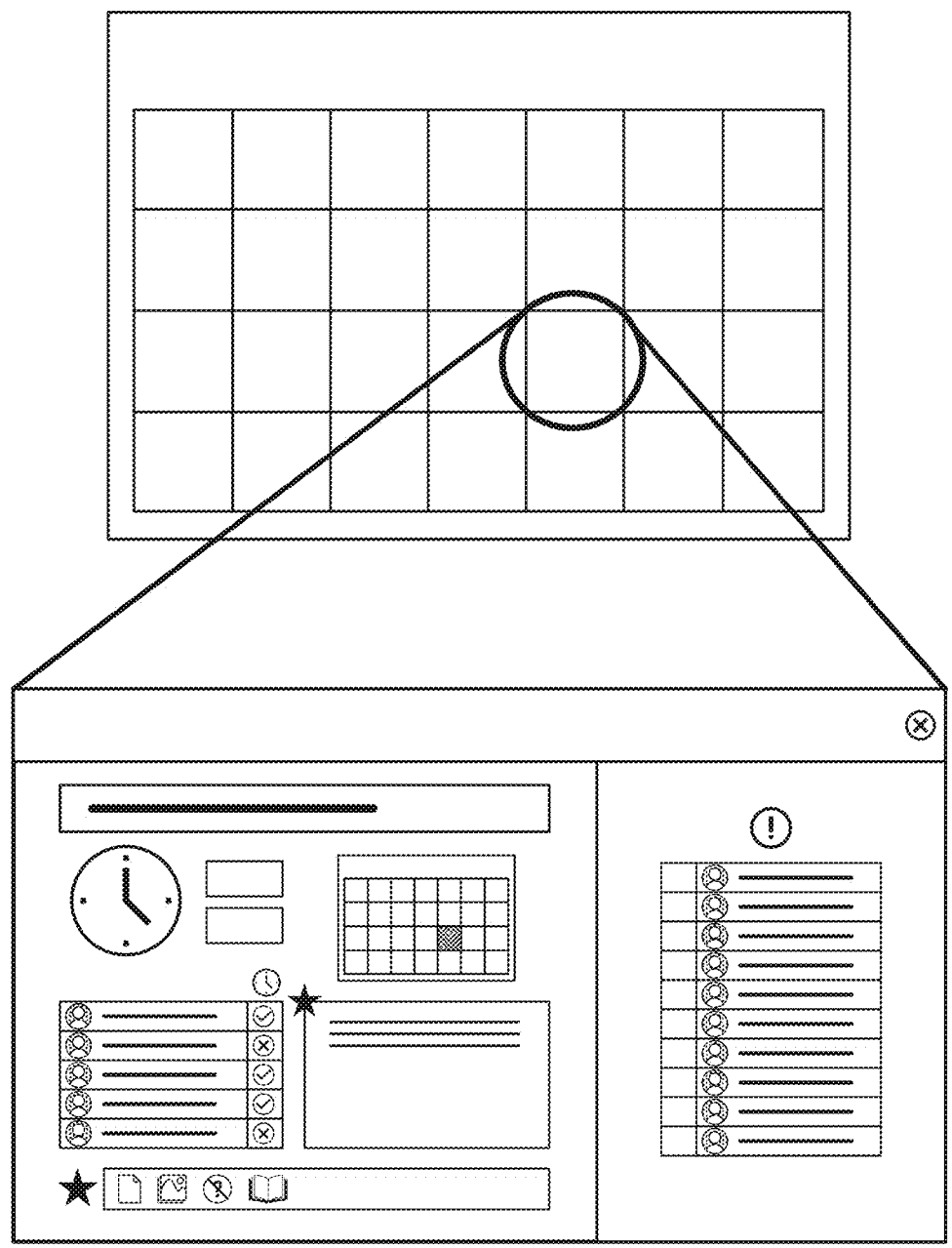
FIG. 1C illustrates exemplary meeting details.
Figure 1D:
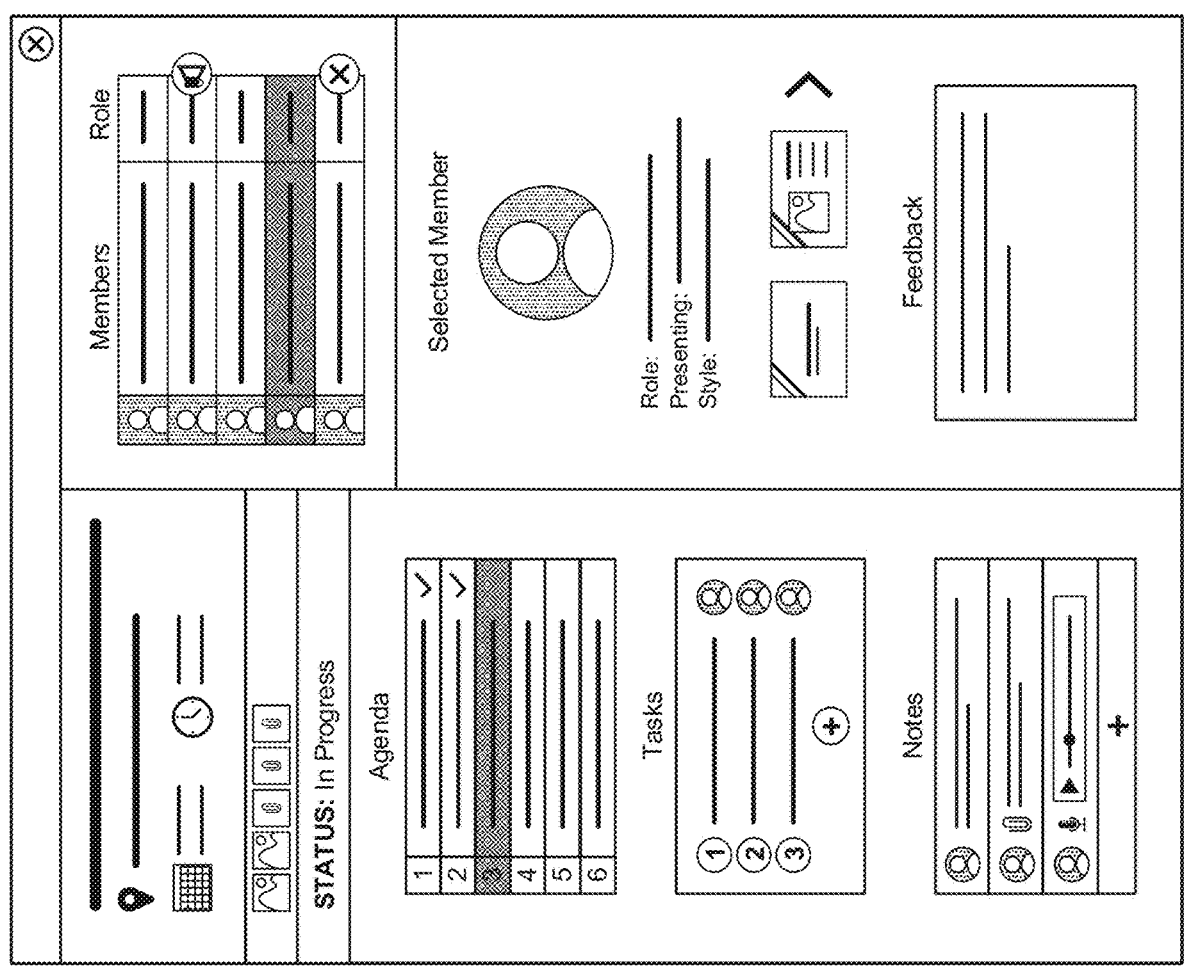
FIG. 1D illustrates an exemplary meeting notes interface.
Figure 1E:
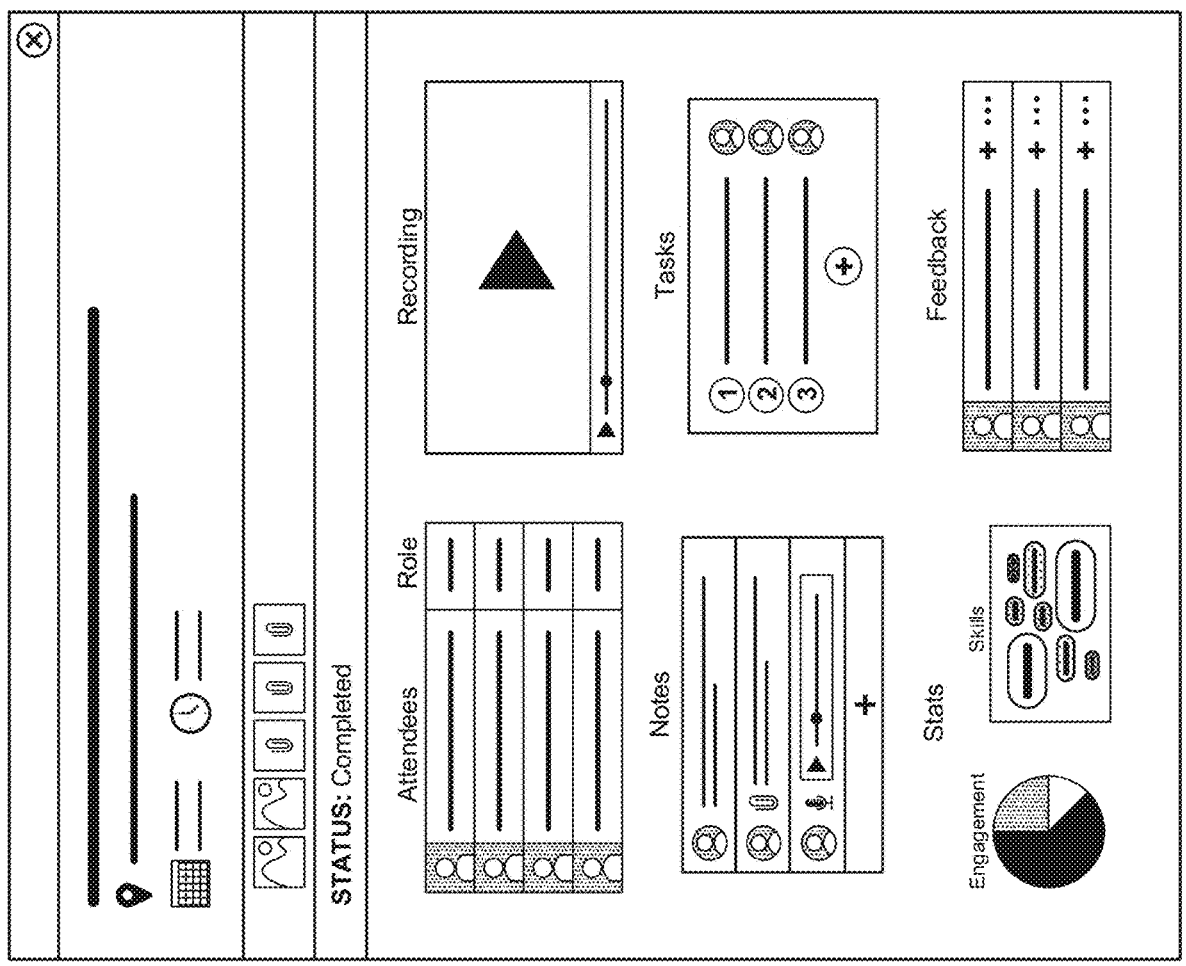
FIG. 1E illustrates a post-meeting dashboard with feedback.

Referring now to FIG. 1A, an exemplary calendar meeting interface is illustrated. Referring now to FIG. 1B, an exemplary calendar meeting interface with behavioral insight details is illustrated. Referring now to FIG. 1C, exemplary meeting details are illustrated. Referring now to FIG. 1D, an exemplary meeting notes interface is illustrated. Referring now to FIG. 1E, a post-meeting dashboard with feedback is illustrated.

In some embodiments, the calendar meeting interface may comprise a distinct calendaring application, such as a downloadable software or web-based product. In some aspects, the calendar meeting interface may be part of an add-on to other applications, such as email or calendaring software. In some embodiments, the host may create a meeting by inputting meeting details, such as date, time, and duration, as non-limiting examples. In some implementations, the calendar meeting interface may allow a host to link or create attendance details, such as to a conference number or to a web-conferencing application.

In some implementations, the host may create an invitee list, and the calendar meeting interface may allow the host to send invitations to each invitee. In some embodiments, information for each invitee may be listed, such as name, contact information, availability, snapshot of their psychometric profile, and whether they have a psychometric profile, as non-limiting examples. In some aspects, the calendar meeting interface may allow a host to transmit a request to invitees to create their psychometric profile and grant access if they have not already.

In some aspects, the host may input purpose and goals, wherein the purpose and goals may prompt meeting suggests, such as invitees, dates, duration, location, and meeting strategies, as non-limiting examples. For example, a host may input a goal of brainstorming a solution to a problem. The host may input a department and an initial list of invitees or the calendar meeting interface may populate some of these details. Meeting suggestions may be based at least in part on behavioral insights. The host may input four invitees who have very similar psychometric profiles, which may not be conducive to brainstorming. The system may suggest other invitees from the selected department who may balance the meeting with complementary psychometric profiles.

In some embodiments, a host may be conducting a series of company-wide meetings to increase awareness and appreciation of a new company mission statement. The system may guide construction of the meetings to increase their effectiveness and efficiency. The system may suggest an effective aggregated psychometric profile, an effective number of invitees, effective meeting strategies, and other meeting details. The system may allow the host to choose to manually populate invitee lists or to allow the system to populate effective invitee lists.

In some aspects, the system may perform a company-wide analysis and determine that the meetings may benefit from having invitees from different departments so that each meeting feels like a representation of the entire company. The system may determine that each meeting would benefit from a known influencer who not only has a particular psychometric profile but also the ability to influence change within the company. In some aspects, power to influence may be measured for each employee, such as through performance data, feedback data, and activity data, as non-limiting examples. For example, a new team member who immediately causes a change in performance data may have the power to influence. As another example, an employee who receives frequent positive feedback may have the power to influence, as other employees tend to notice their activity and think highly of it.

In some aspects, a calendar meeting interface may provide calendaring information of other potential attendees, which may allow for easier scheduling. In some embodiments, the calendar meeting interface may integrate into an existing calendaring system, such as through an API or plugin, as non-limiting examples. In some implementations, a calendar meeting interface may comprise a behavioral insight dashboard that may display behavioral insights of potential attendees. In some aspects, the behavioral insights may display a group profile, where the behavioral insights of the attendees are aggregated or processed as a group.

In some embodiments, a calendar meeting interface may allow for input of meeting information, such as date, time, purpose, preparation tasks, or goals, as non-limiting examples. In some aspects, access and visibility of behavioral insights may be based on access level of the host of meeting or relevance to the meeting. For example, if a lower level team member is organizing a team meeting, they may have more limited access to the behavioral insights than a manager of that same team. For the lower level team member, their visibility may be limited to a group profile, which may change and adjust as requested attendees are changed. For the manager, they may be able to see individual behavioral insights.

In some implementations, a meeting interface may allow for smart text input. For example, attendees may be tagged for feedback or action items, and as the feedback is typed, the meeting interface may prepopulate or suggest terms, phrases, or illustrations based on behavioral insights associated with the attendee. This may allow for real time adjustment of feedback that is customized and optimized for the attendee. Where the feedback may be given to a group of attendees, the feedback may be presented to each attendee based on their personal behavioral insights.

In some embodiments, the system may enable employees invited to a meeting to post files such as presentation files, work product, or other documents relevant to the meeting, as non-limiting examples. In some implementations, the system may organize a meeting to facilitate flow, create less downtime, and increase productivity. In some aspects, the system may provide a message board that allows attendees to communicate before, during, or after meeting. In some implementations, the system may inform attendees when a meeting may be delayed, indicate when a member leaves a meeting, or when all participants are ready for a meeting to begin.

In some aspects, meetings may be created based on behavioral insights, which may allow for effective attendee groups. For example, a purpose of the meeting may require attendees from multiple teams or departments. The system may analyze the behavioral insights, skills, and roles of members of those teams or departments. It may compare the purpose to the analysis of each team member, and based on that comparison, a suggested list of effective attendees may be generated. In some embodiments, behavioral insights may be shown for one or more attendee, team or department, or meeting attendee group.

Unlike a manual assessment or review of individual behavioral insights, the system may process multiple profiles and create a set of attendees that are precisely suited to accomplish a purpose of a meeting. For example, attendees may have similar extrovert and risk-taker levels and may be matched up in meetings together where the purpose is to develop expansion strategies. Those attendees may need to be balanced by attendees that are more risk averse. The system may be able to determine how many attendees or what risk-taking level may effectively counter the risk-taking attendees.

In some implementations, the interface may communicate behavioral insights of attendees through a range of styles. In some aspects, the interface may have a brief description to explain how the conclusions were determined. For example, a profile may have a large strategist section in their chart and the reasoning may be explained in a few sentences as to why the profile was evaluated the way it was. In some aspects, a meeting set up interface may list or illustrate behavioral insights of potential attendees.

In some implementations, these meetings set up through the interface may be entered and viewed through a calendar system. For example, when scheduling a meeting a calendar system may appear so that the meeting may be scheduled on a specific day at a specific time. In some embodiments, the calendar system may be set up with notifications to communicate reminders to potential or confirmed attendees, wherein the communication may include other attendees, behavioral insights for one or more attendees, organizer, or group, or purpose of the meeting. In some implementations, the calendar may allow for notes to be added to the meeting time and date. For example, the meeting creator may indicate whether attendees need to bring something, prepare materials or ideas, or expectations and goals of the meeting.

In some aspects, a meeting interface may integrate with a video or telecommunications platform, wherein behavioral insights may be provided in conjunction with the platform. For example, a meeting interface may allow for display of the video or telecommunications platform, and behavioral insights may be presented in real time. The behavioral insights may be displayed based on who is speaking. Similarly to options for video conferencing, settings for behavioral insights may allow for different views, such as speaker view where the behavioral insights for the speaker display, group view where the group behavioral insights display, individual view where separate behavioral insights for each attendee may be displayed, as non-limiting examples.

In some embodiments, the host of the meeting may control visibility of behavioral insights for attendees. In some aspects, the host or presenter for the meeting may see behavioral insights of attendees for reference throughout the meeting. In some implementations, feedback may be presented and displayed in real time, where the host or speaker may see how attendees are receiving the presentation. This may allow for real time adjustment of the presentation or hosting, which may increase effectiveness. In some embodiments, the feedback may be collected and then presented after the meeting, which may be less distracting for speakers.

In some implementations, during the meeting, notes may be taken and tasks may be generated in real time and saved in a file attached to the meeting. In some embodiments, tasks and other notes may be taken prior to the meeting and attached to the meeting. In some embodiments, the notes and tasks may be edited in real time during the meeting or after the meeting. In some aspects, the meeting attendees may have an option to give feedback to the notes, tasks, attendees, or meeting as a whole. For example, the attendees may write notes that the meeting was too long, not informative enough, or unclear, as non-limiting examples. As another example, attendees may provide feedback to another attendee in the meeting, such as a presenter or someone who provided work product for the meeting.

In some embodiments, a meeting interface may comprise a progress dashboard that may track activity for a meeting, which may include presentation materials, feedback, notes, and tasks, may be tracked from initiation of the meeting through completion of meeting tasks. In some aspects, a meeting interface may comprise a feedback dashboard, which may provide feedback for particular attendees. In some aspects, the feedback dashboard may provide feedback for a user. In some embodiments, the feedback dashboard may provide feedback for other attendees, such as those a user may manage. In some implementations, the feedback dashboard may be customized based on behavioral insights associated with the user.

In some embodiments, meeting notes may be crowd-sourced among attendees, allowing for real time sharing of notes. In some implementations, visibility and accessibility of meeting notes may be based on preferences, permissions, and access levels. For example, a meeting host may have access to all of the meeting notes, and attendees may only have access to their own. As another example, attendees may be able to identify other attendees to whom they grant access to their notes. In some aspects, display of notes on a meeting dashboard may be customized based on behavioral insights. Where the notes may be processed for the entire group, the customization may be based on group behavioral insights, such as through aggregation, averages, or weight analysis of individual behavioral insights. In some embodiments, a notes portion of the meeting interface may integrate with existing note software or systems, which may allow for seamless synchronization between the meeting interface and internal systems.

In some aspects, notes may be exported and sent to meeting attendees. In some embodiments, notes and recordings of the meeting may be attached to a calendaring system, wherein users, who may or may not be attendees, can access the information. Where a set of tasks are generated during the meeting, the tasks may be transmitted to relevant groups and individuals. For example, tasks may be transmitted to managers, individuals responsible for executing the task, and attendees. In some embodiments, the tasks may be exported to an external task management platform. In some aspects, task progress may be tracked, such as through the external task management platform or internally. In some implementations, one or more managers, attendees, and hosts may input information related to preparation for the meeting, such as an agenda, pre-meeting tasks, expectations, and categorization, as non-limiting examples In some aspects, categorization may occur through labels, hashtags, or illustrations, and may be automatically populated or suggested based on meeting information or directly input. In some aspects, behavioral insights may be provided along with transmitted information, such as the tasks, agenda, meeting expectations, notes, or recording, as non-limiting examples.

In some embodiments, tasks and action items may be populated or entered during the meeting. This may allow for effective and accurate project management that limits issues that may arise when an attendee creates tasks after the meeting based on their interpretation of the project. Where action items and projects may be shared and crowdsourced, a project manager or other attendees may be able to weigh in and suggest changes or additions during the meeting. That way, once the meeting ends, the attendees all have a clear set of objectives to complete after the meeting. In some aspects, the meeting interface may comprise a project dashboard that may collect projects, tasks, and action items throughout the meeting. The display of the project dashboard may be customized and based on the particular comprehension styles of each attendee based on their behavioral insights.

In some aspects, the meeting interface may integrate with an external project management platform or system, wherein tasks, action items, or projects generated during the meeting may be synchronized or transferred to the project management platform. In some embodiments, behavioral insights may follow the generated projects to the project management platform, wherein behavioral insights associated with assigned attendees may be displayed within the project management platform. Visibility and accessibility of the behavioral insights may be limited based on original accessibility rules established within the meeting interface, such as during the calendar stage, meeting stage, or project stage.

In some implementations, a meeting interface may display consolidated notes from the meeting. The consolidated notes may be a collection of all notes received during the meeting. The collection may be sortable or filtered to allow for an organized processing of the notes. In some aspects, the collection of notes may be processed separately, and the meeting interface may provide a custom and curated display of the notes. The curated notes may be based on predefined parameters, such as syntax, linguistics, behavioral insights, preferences, or size limitations, as non-limiting examples.

In some embodiments, the system may collect and generate meeting analytics that may provide objective feedback on how effective a meeting was. Effectiveness may be based on a range of factors, including, for example, how well a presentation aligned with the behavioral insights, engagement of attendees, feedback for the meeting, or completion of action items generated during the meeting. These analytics may be customizable, such as based on purpose of a meeting, structure of a meeting, enterprise needs, or defined measurable milestones.

Figure 2A:
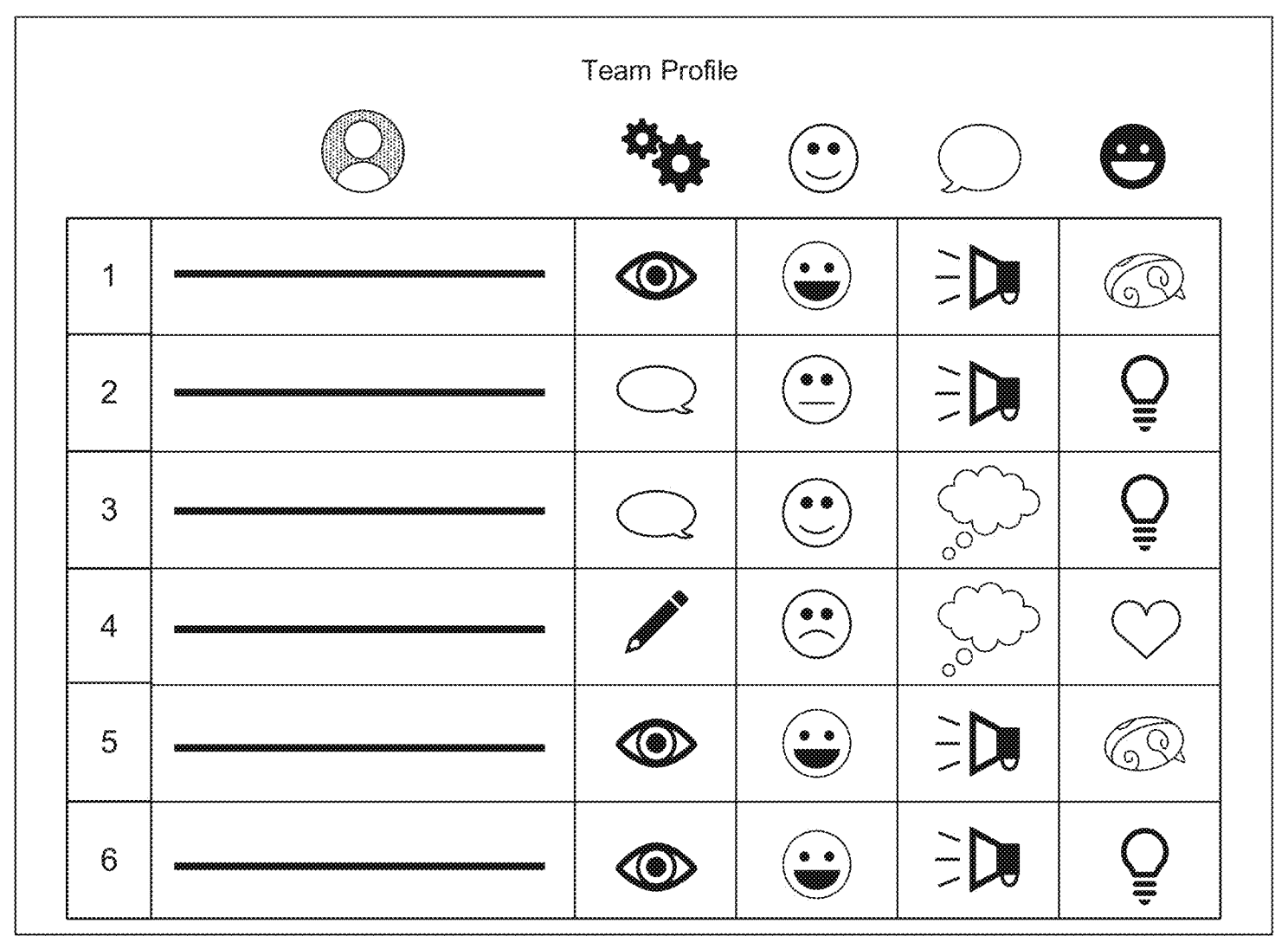
Figure 2C:
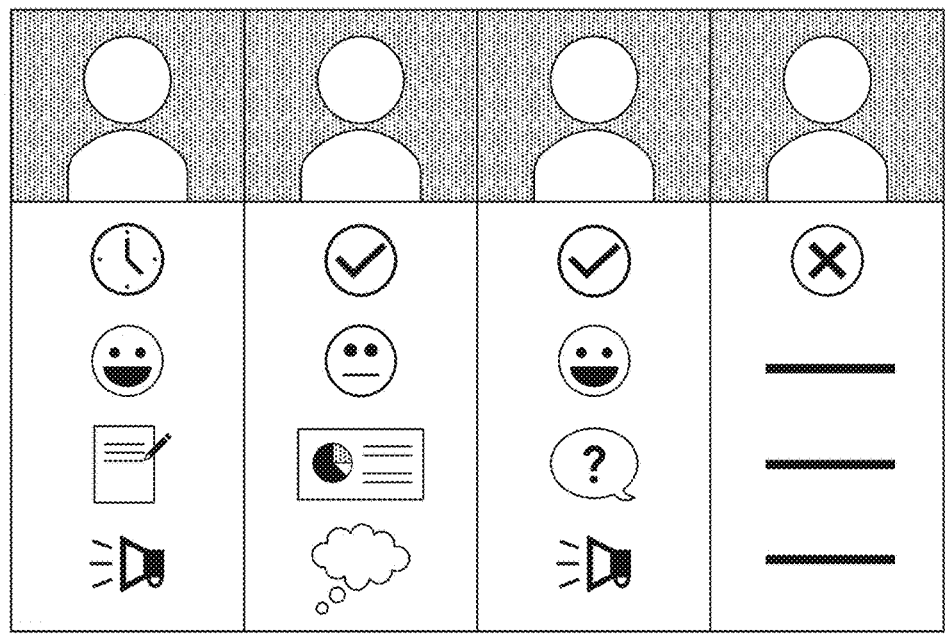
FIG. 2C illustrates exemplary behavioral insights for attendees in illustration form, wherein the behavioral insights are based at least in part on psychometric profiles.
Figure 2D:
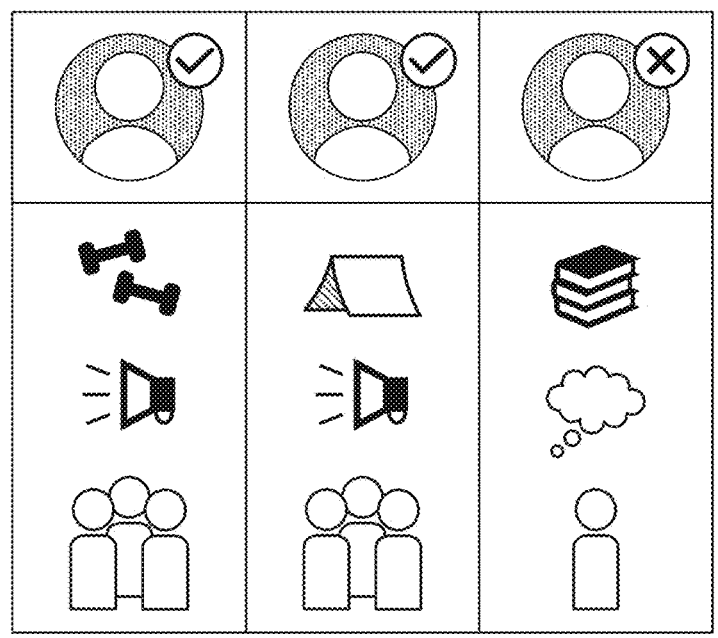
FIG. 2D illustrates exemplary behavioral insights for attendees in illustration form, wherein the behavioral insights are based at least in part on psychometric profiles.

Referring now to FIG. 2A, exemplary behavioral insights for a team are illustrated, wherein the behavioral insights are based at least in part on psychometric profiles. Referring now to FIG. 2B, exemplary behavioral insights for a team in text form are illustrated, wherein the behavioral insights are based at least in part on psychometric profiles. Referring now to FIG. 2C, exemplary behavioral insights for attendees in illustration form are illustrated, wherein the behavioral insights are based at least in part on psychometric profiles. Referring now to FIG. 2D, exemplary behavioral insights for attendees in illustration form are illustrated, wherein the behavioral insights are based at least in part on psychometric profiles. In some embodiments, a team may comprise an organizational team, such as within a particular department or assigned to a particular project. In some aspects, a team may comprise an invitee list for a meeting, as the invitees may be considered a specialty team assigned to the goal or purpose of the meeting.

In some implementations, a team may comprise the founders of a company or the c-suite of a company. In some aspects, a team may be an existing team or one that has not yet been built. Understanding the aggregate behavioral insights and psychometric profiles of a team may allow for a better understanding on how to help the team succeed. It may also be helpful to anticipate the strengths and weaknesses of a team before it is created. In some aspects, the team may be adjusted to create a more balanced or effective aggregate psychometric profile.

For example, a venture capital group may be interested in investing in a startup with three founders. An understanding of their behavioral insights and psychometric profiles, both aggregated and individual, may allow them to make a more informed decision. They may also use the information to add or remove team members to increase the chance of success of the startup. In some embodiments, there may be known psychometric profiles or identified successful teams for particular goals, such as founders of a successful startup, wherein a comparison of a team's psychometric profiles and behavioral insights may be useful to predict outcomes.

Figure 3A:
FIG. 3A illustrates an exemplary attendee compatibility interface, according to some embodiments of the present disclosure.
Figure 3B:
FIG. 3B illustrates an exemplary attendee compatibility interface, according to some embodiments of the present disclosure.

Referring now to FIG. 3A, exemplary calendar system flow is illustrated. Referring now to FIG. 3B, an exemplary attendee compatibility interface, according to some embodiments of the present disclosure is illustrated. In some aspects, the system may suggest or guide the invitee list based on predefined criteria. In some aspects, the predefined criteria may include psychometric characteristics, individual roles within a team, team roles within the company, relevance of the roles to the topic of the meeting, or influence within the team or company, as non-limiting examples.

For example, the topic may be related to a new project, and the invitees may be those who need to execute the project. The topic may relate to company missions and culture, and the invitees may be those who have the most influence within the company. In some aspects, the system may allow a host to initiate a meeting. In some embodiments, the system may allow a host to set up a series of meetings that may accomplish similar action items or goals, wherein each set of invitees may comprise a similar aggregated psychometric profile.

As an illustrative example, a company-wide meeting about workers compensation may be necessary, and according to regulation, each meeting can be no larger than ten people. The system may help divide up the workforce so that each set of invitees may be effective with a similar presentation and meeting strategy. Without behavioral insights, a host may create invitee sets with only type A personalities or without any type A personalities. It may be beneficial to balance out the group based on predefined criteria.

In some embodiments, the calendar system may facilitate a due date-based system for employees to submit material directly into the system without an email. In some implementations, the system may include important events for an individual, such as whether for personal life, work related, or other considerations an organizer may want to know. For example, if an employee has unavailability, the system will not provide that time when an organizing is assembling participants for a meeting. In some aspects, the system may automate recurring meetings based on each participant's availability, with the recurring meeting time subject to change based on each participant's changing schedule. For example, the system may automatically move a meeting time to the next available slot on everyone's calendar if a participant becomes unavailable and issue a notification to all participants advising them of the new time and date.

In some aspects, institutions and companies may create invitee lists tailored to specific events. In some embodiments, the pool of potential invitees may be expansive and extend beyond their internal population. For example, psychometric profiles for juniors contemplating college may be accessed, and recruiters may be sent to locations with compatible students. Invitee lists may be compiled and customized based on effective strategies. For example, an engineering school in California may send out a recruiter to Atlanta, where the invitee list may include introverts who are not likely to travel to tour campuses, and a dance school in New York may invite candidates to visit the campus and partake in a sample class, where the invitee list may include students who need to experience something before forming an opinion on it.

Figure 4A:
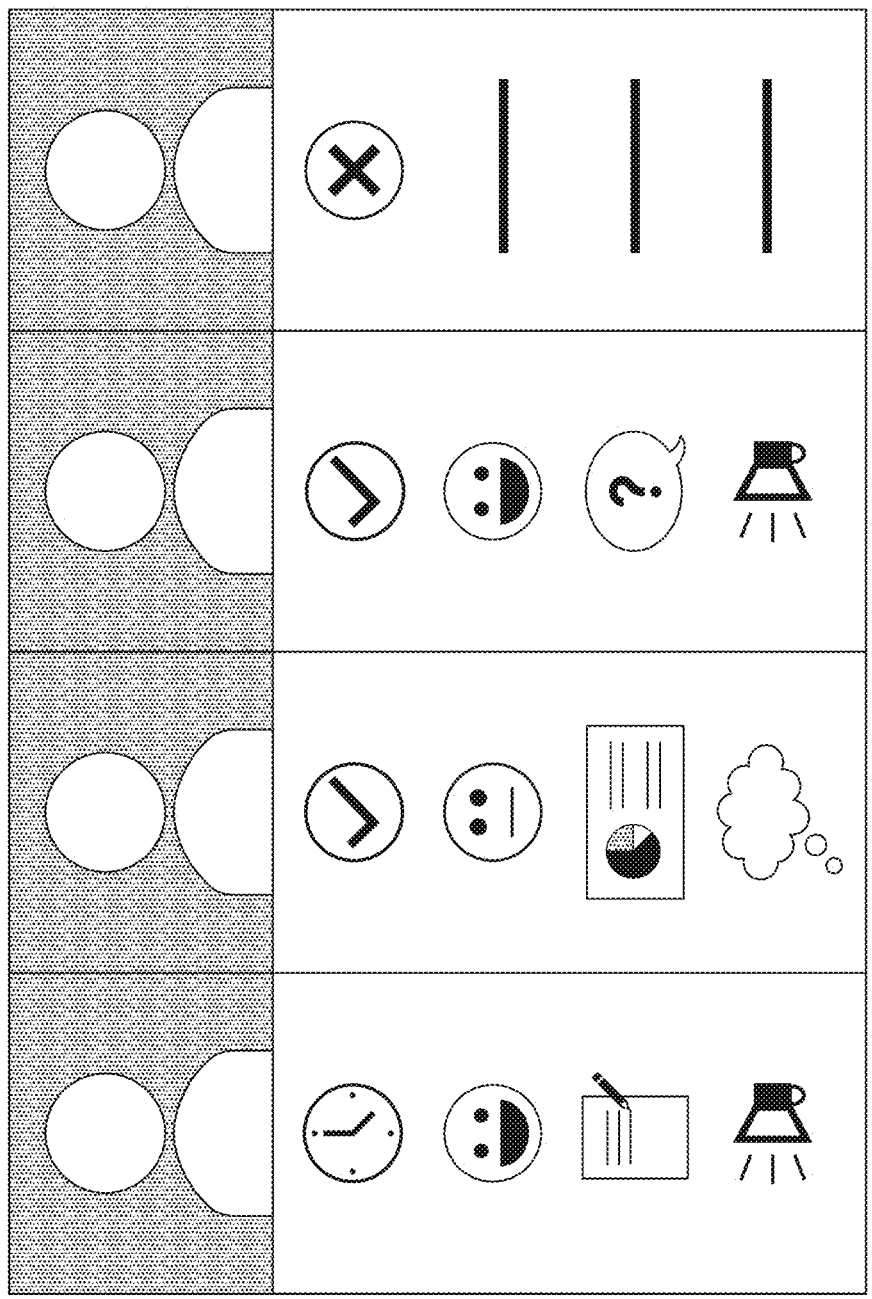
FIG. 4A illustrates exemplary behavioral insights for a team in illustration form, wherein the behavioral insights are based at least in part on psychometric invitees.

Referring now to FIG. 4A, exemplary behavioral insights for an invitee list are illustrated, wherein the behavioral insights are listed with named invitees. Referring now to FIG. 4B illustrates exemplary behavioral insights for a team in text form, wherein the behavioral insights are based at least in part on psychometric invitees. In some aspects, the behavioral insights for each individual invitee may allow a host to tailor the meeting to each of their needs. For example, the host may be able to offer meeting materials ahead of the meeting for those who would benefit from pre-meeting materials and may send summary materials after the meeting for those would benefit from post-meeting reference materials.

As another example, knowing that some of the invitees may not benefit from questions and may in fact become irritated or bored from them, the host may give the option for invitees to leave before questions. Allowing those who would not benefit from the questions to leave may increase the host's goodwill with those individuals and may increase their productivity in the long run. In many cases, an invitee may not be aware which approach may be most effective for them, and providing the behavioral insight for each individual may allow the host to have a better control on the team.

For example, Employee E may not realize he needs to be present for the questions portion of the meeting, and Employee A may not know she is not likely to benefit from additional material or questions. Knowing their behavioral insights, the host may call them out individually to increase their productivity. Before questions, the host may ask Employee A to leave the meeting to perform a specific task, and the host may ask Employee E to stay so the host can follow up about another topic after the meeting. This may allow both invitees to attend an effective meeting that is tailored to their individual needs, without requiring separate meetings for different psychometric profiles.

In some aspects, the behavioral insights may include effective styles for each invitee, such as level of formality, length of the meeting, and information type. In some embodiments, the behavioral insights may be able to guide other details of the meeting, such as an effective meeting time, location, attendee number, as non-limiting examples.

In some embodiments, a host may designate a meeting anchor who may be considered the most significant invitee. For example, the meeting may comprise a sales pitch, and the host may designate the decision maker invitees as the anchors. This may allow a host to concentrate on a meeting strategy that may effectively address the behavioral insights of anchor, with a secondary consideration for the other invitees. As another example, the meeting may comprise a workshop with an extensive invitee list, so the host may designate the team leaders or the most effective influencers as the anchor psychometric profiles. This may allow the host to efficiently conduct the workshop where the leaders and influencers may be able to increase the effectiveness of the other invitees.

In some aspects, meeting insights and strategy suggestions may be useful for student groups, such as clubs, Greek life, study groups, laboratory groups, sports teams, or project teams, as non-limiting examples. In some embodiments, students may form their own study groups for a class, and meeting insights may help them develop an effective way to study together. For example, one study group may benefit from practice tests and open discussion, whereas another study group may benefit more from shared outlines and flash cards.

In some implementations, psychometric profiles may allow for effective pairing in clubs, such as debate teams. Understanding the psychometric profiles of each team member may allow each student to debate against a range of personality and debate types, which would better prepare them for a debate. In some aspects, an opponent may be unknown so preparing against a range of personalities would be effective, and in some embodiments, an opponent may be known or may be selected from a known group. The debate team may have access to the psychometric profiles of their opponents and prepare accordingly.

Figure 5:
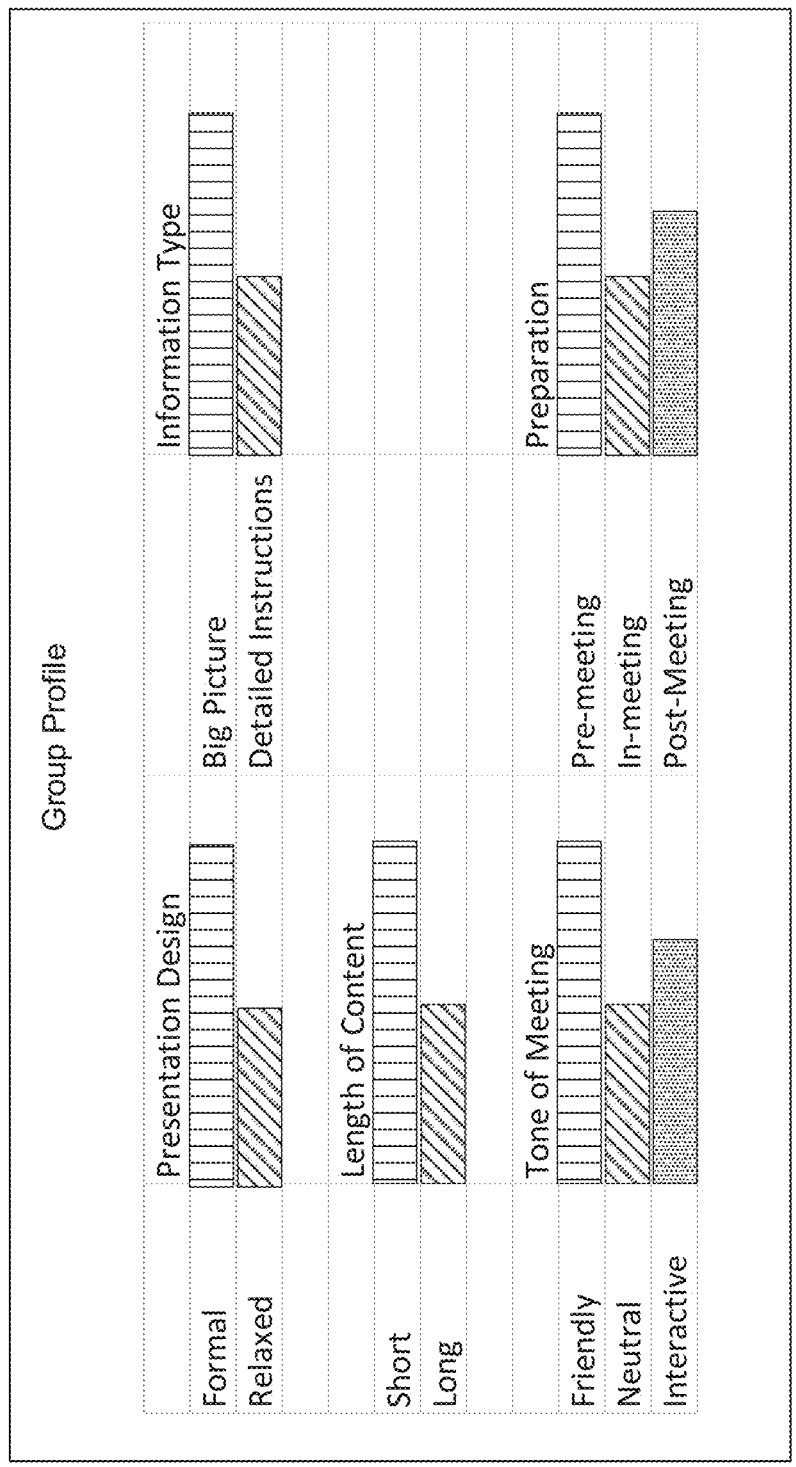
FIG. 5 illustrates exemplary behavioral insights for a team, wherein the behavioral insights are based at least in part on psychometric generally.

Referring now to FIG. 5, exemplary behavioral insights for an invitee list are illustrated, wherein the behavioral insights are provided generally. In some embodiments, detailed behavioral insights for each invitee may not be allowed or beneficial. For example, organization policy may prevent employees from viewing each other's psychometric profiles for privacy reasons. As another example, where the meeting may be a conference or speaking engagement, the number of invitees may be too high for an effective comprehension of their detailed behavioral insights. In some aspects, the behavioral insights may be provided in aggregate, such as through graphics, charts, percentages, or graphs, as non-limiting examples. This may allow for an effective comprehension of aggregated psychometric profiles of invitees.

In some embodiments an individual invitee may input personal preferences beyond a behavioral profile. For instance, if the invitee is not able to eat a certain food, the user may input that to the organizer to make the appropriate accommodations. In some aspects, an invitee's profile may include interests, networks, aspirations, associations, resume information, or combinations thereof. This information may allow for more nuanced structure or content for the meeting. For example, the majority of invitees may all by outdoor enthusiasts, so having a meeting outside may be beneficial. As another example, the majority of the invitees may play fantasy football, so sports references may be a useful strategy.

In some implementations, educational institutions or clubs may utilize meeting strategy insights. For example, a resident advisor (RA) may prepare for floor meetings by learning about the behavioral insights of their residents. This may allow the resident advisor to better mentor and encourage connections beyond the traditional "ice breakers," which may have limited effectiveness, particularly for incoming freshmen. Based on the psychometric profiles of their residents, an RA may host targeted events tailored to the students. For example, the majority of residents may indicate an interest in video games, and the RA may host retro video game nights to bring the residents together over shared interests.

In some embodiments, this strategy may be applied in a broader way to the student body for an educational institution. In some aspects, underclassmen may be paired with upperclassmen mentors, based on comparable or complementary psychometric profiles. For example, an introverted freshman who is interested in astrophysics and baseball may be paired with an extroverted upperclassman who is a teaching assistant for an astrophysics sophomore level course and on the intramural baseball team at the university. As another example, a visiting high school senior may be interesting in fencing and Greek life, so when they visit the campus, their host may be someone on the fencing team and a member of a sorority.

In some aspects, meeting strategy and behavioral insights may be applied to orientation or housing. For example, roommates may be paired based on comparable or complementary interests and psychometric profiles. This may reduce the chance for friction between roommates and increase the chance the roommates will become friends. In some implementations, each year, students may receive suggestions for clubs, associations, extracurricular activities, Greek houses, courses, events, or combinations thereof, as non-limiting examples. As a student is enrolling for the next semester, the student may select courses they are interested in, and based on behavioral insights, an effective schedule may be suggested. In some aspects, clubs or extracurricular activities may be suggested, which may be based on interests, behavioral insights, and schedule, as non-limiting examples.

Referring now to FIG. 6, exemplary behavioral insights and meeting strategy suggestions are illustrated. In some aspects, a summary of behavioral insights for invitees may be provided, which may allow the host to prepare based on the summary. In some embodiments, the summary may be paired with more detailed behavioral insights, such as illustrated in FIGS. 4 and 5. In some implementations, the summary may be based on the percent of invitees with particular psychometric profile attributes, wherein the summary indicates behavioral insights for the majority of the invitees.

In some embodiments, the summary may be based on the most sensitive psychometric profile attributes. For example, eight out of ten invitees may benefit from a big picture presentation, and two out of ten invitees could not be effective without the details. Those eight out of ten may not be negatively impacted by the details, so the summary may suggest the presentation of details. A system providing a dynamic summary of behavioral insights may process the psychometric profiles of each invitee and weigh their attributes and behavioral insights, wherein the summary may provide group behavioral insights and suggested meeting strategies based on weighted assessments.

In some aspects, the summary may evolve as invitees either accept or decline attendance. This may allow for dynamic behavioral insight that updates as the invitee list changes. For example, if all the invitees who need time for questions decline the invitation, the host may remove that portion of the meeting. In some embodiments, the summary may provide suggestions on meeting details, such as the best time of day to conduct the meeting or the most effective location. For example, the invitees who need more details may benefit from a morning meeting with food, which may give them the rest of the day to process the contents of the meeting and sustenance to last through a long meeting. As another example, where invitees may have a hectic schedule and only need a quick overview, the meeting may be held in the break room as a standing huddle.

In some embodiments, as enrollment or participation changes for a university, classes, clubs, sports teams, or other groups, the summary may evolve. For example, a video or event intended for all applicants may have a different strategy than for students accepted or those who actually enroll in the university. Similarly, try out instructions for a debate team may have a different structure than those for team members, as the group psychometric profile may be different.

Figure 7:
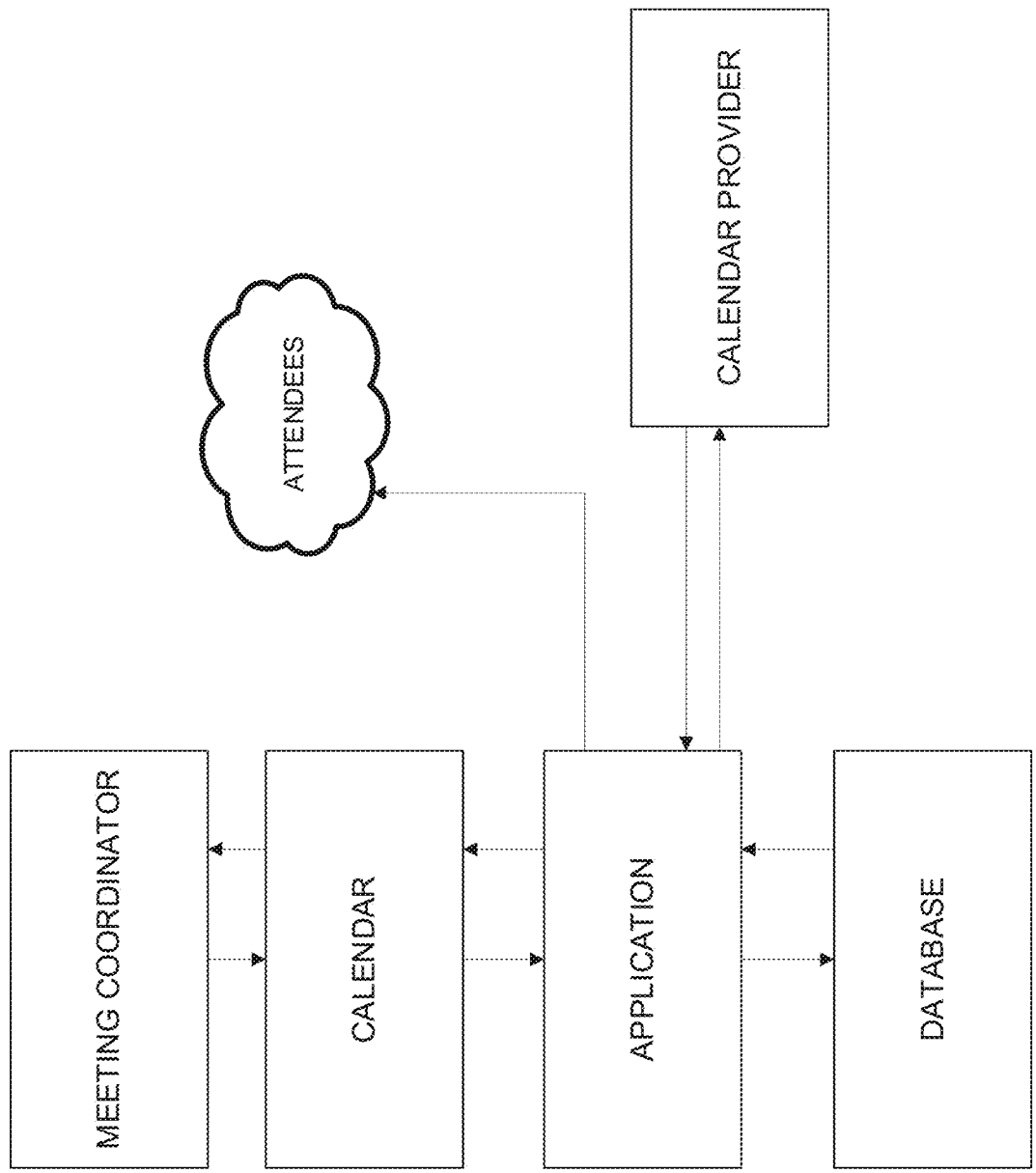
FIG. 7 illustrates exemplary data flow for a behavioral insight system, according to some embodiments of the present disclosure.

Referring now to FIG. 7, exemplary data flow for a behavioral insight system is illustrated. In some aspects, a meeting coordinator may input to the calendar system meeting information, such as meeting details, invitee list, and meeting type, as non-limiting examples. In some embodiments, that information may be transmitted to the application, wherein the application may access the database to retrieve and process the psychometric profiles of the invitees, the list of non-registered invitees, and data for other potential invitees, such as those suggested by the application.

In some aspects, the application may logically interface with a calendar provider, which may be internal or external, wherein the application may transmit meeting information, such as invitee list and meeting details, as non-limiting examples. In some embodiments, the calendar provider may export a calendar event to the application. In some implementations, the application may output information to the calendar, such as behavioral insights, meeting strategies suggestions, and suggested invitees, as non-limiting examples. In some aspects, the behavioral insights and meeting strategies may be presented by individuals, groups, or combinations thereof. In some implementations, the calendar event may be output from the application through the calendar to the meeting coordinator. In some aspects, the calendar event and invitation to create a psychometric profile may be transmitted to the invitees.

Figure 8:
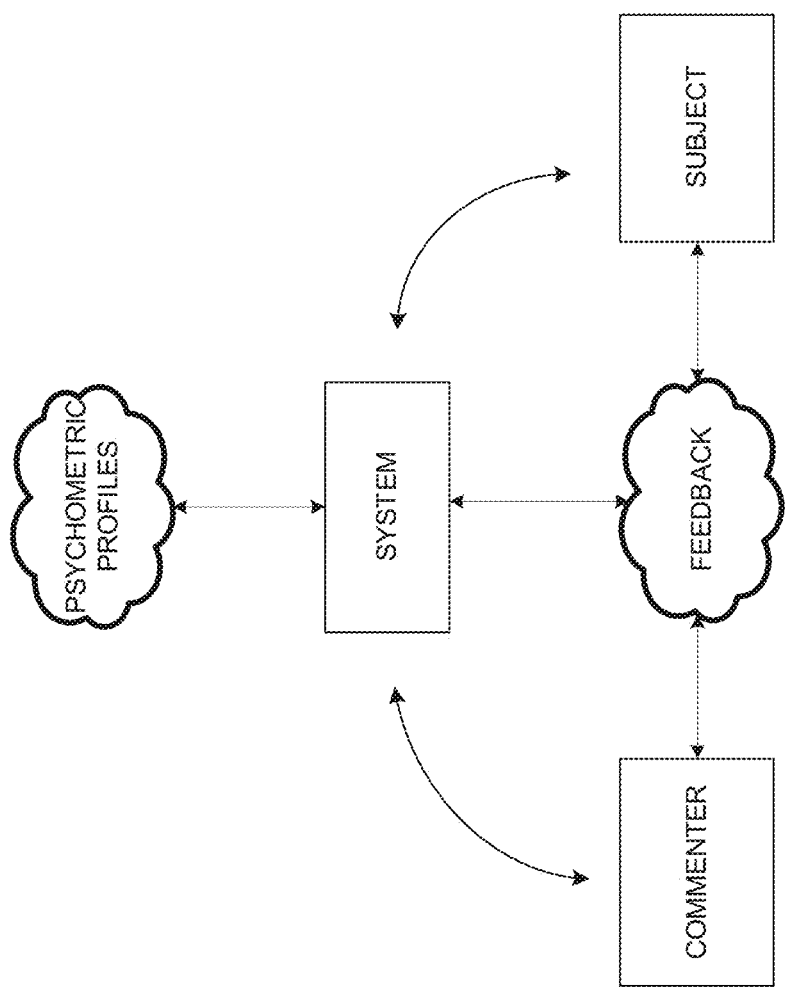
FIG. 8 illustrates exemplary data flow for a dynamic feedback system, according to some embodiments of the present disclosure.

Referring now to FIG. 8, an exemplary data flow for a dynamic feedback system is illustrated. In some aspects, a commenter may provide feedback for a subject, wherein the subject may be an individual or a group. In some embodiments, the feedback may be instant, wherein the subject may receive the feedback almost immediately. In some aspects, the feedback may be provided periodically, such as once a day or monthly.

Periodic delivery of feedback may allow for truly anonymous comments, as it may be more difficult for the subject to figure out who the commenter is based on context. Periodic delivery of feedback may allow for aggregation of feedback, which may be from identified commenters or anonymous. In some aspects, it may be useful to specifically identify a commenter, such as when the feedback is from a manager. In some situations, aggregating and anonymizing the feedback may be beneficial.

As an illustrative example, a subject may have given a presentation in a meeting to ten other team members and a manager. The subject may want to know which of the feedback is from the manager. The manager may be able to provide both identified feedback and anonymous feedback. The manager may leave detailed feedback as an identified commenter and general feedback anonymously.

The meeting may prompt a commenting interface customized to the activity, which may include requests for general feedback, such as ability to hear the subject, quality of presentation materials, apparent familiarity of the subject with the presentation, or other relevant comments. The subject may view the general feedback in aggregate, which may aggregate the feedback from other attendees or from other meetings where the subject presented.

In some aspects, commenter interface may be customized, such as based on the commenter's organizational role, the subject's organizational role, the action that triggered the feedback, preferences, or organizational policy, as non-limiting examples. In some implementations, commenters may want to provide feedback unprompted where a subject action may not prompt an event-based commenter interface.

In some embodiments, commenters may be able to provide open-ended feedback, such as through open text fields. Commenters may have known writing tones or styles, where if the freeform feedback is provided exactly how it is input, the subject may be able to discern who provided the feedback. In some aspects, freeform feedback may be dissected into key words, phrases, or meanings, which may be presented to the subject in segments.

For example, a commenter may state that "the subject provided a clear explanation of the topic but was unable to answer questions with confidence." The feedback may be presented as "clearly explained topic" and "lacked confidence when answering questions." As another example, ten people may provide freeform feedback with various versions of "confusing", "couldn't hear", and "nervous", and the subject may receive the feedback seeing only those terms without seeing the various versions. The presentation of this feedback may be provided in a word tree, which may visually indicate which feedback was more prominent.

In some aspects, understanding the behavioral insights of invitees may allow for more effective feedback. In some embodiments, behavioral insights of the host may be provided to the invitees to allow them to provide effective feedback. In some implementations, feedback that may be ineffective based on the subject's behavioral insights may not be presented or may be presented in a less predominant view.

For example, a subject may not benefit from learning they "seem nervous" during a presentation because they may have a stutter that makes them self-conscious. The subject may benefit from feedback that relates to the quality of their presentation, such as their grasp of the subject or their ability to speak clearly on the topic. In some aspects, a manager may be able to view the feedback relating to nervousness, as they may want to track the subject's ability to acclimate to presentations.

In some embodiments, the feedback may be filtered so that the reviewee may only see productive feedback, such as those where the reviewee is likely to change based on behavioral insights. In some implementations, the reviewer may receive feedback on the review such as highlighting what the reviewee is likely to change or what feedback is likely to be ignored. In some embodiments, the types of feedback may be stored with the reviewee profile where historical or aggregated data may be provided, such as to highlight how often the reviewee received comments related to attributes she is not likely to change, how often they received changeable feedback, how the reviewee responded and changed over time, as non-limiting examples.

In some embodiments, a reviewer may not have any training in providing feedback, such as a colleague at work or another student in a class. In some implementations, this may invite unproductive or untethered feedback. In some aspects, feedback from an unqualified or qualified reviewer may be evaluated for general productivity to avoid completely unrelated comments, such as insults or non sequitur remarks. In some implementations, the system may designate feedback as irrelevant or offensive and prevent the dissemination of that feedback to the reviewee. Where feedback may be reviewed by a supervisor, irrelevant or offensive remarks may be tagged so the supervisor may address the issue with the reviewer.

In some embodiments, feedback may be tagged, wherein the feedback may be directed to different people, teams, departments, or other party who may need to see the feedback. For example, feedback that may suggest or imply that a team or individuals may be committing a crime or misusing company resources may need to be directed to the company's designated ombudsman. Designating the feedback to go to a specific party may protect the reviewer who may be less inclined to provide that type of feedback if it were to be seen by other team members or managers.

In some aspects, feedback may be organized into categories based on previous tags. For example, the feedback may be tagged "needs improvement" and the user may then browse the file to see what they need improvement on. In other embodiments, the feedback may be tagged "great" and the user may then read the positive reviews about their performances to help boost self-esteem. Labeling and organization of the feedback may allow an individual to effectively view and understand their feedback history. In some aspects, similar feedback may be grouped, which may limit redundancy within a psychometric profile. For example, a word chart may indicate common words used in feedback, where the relative size of the word may indicate how prevalent the word is for that individual.

Figure 9:
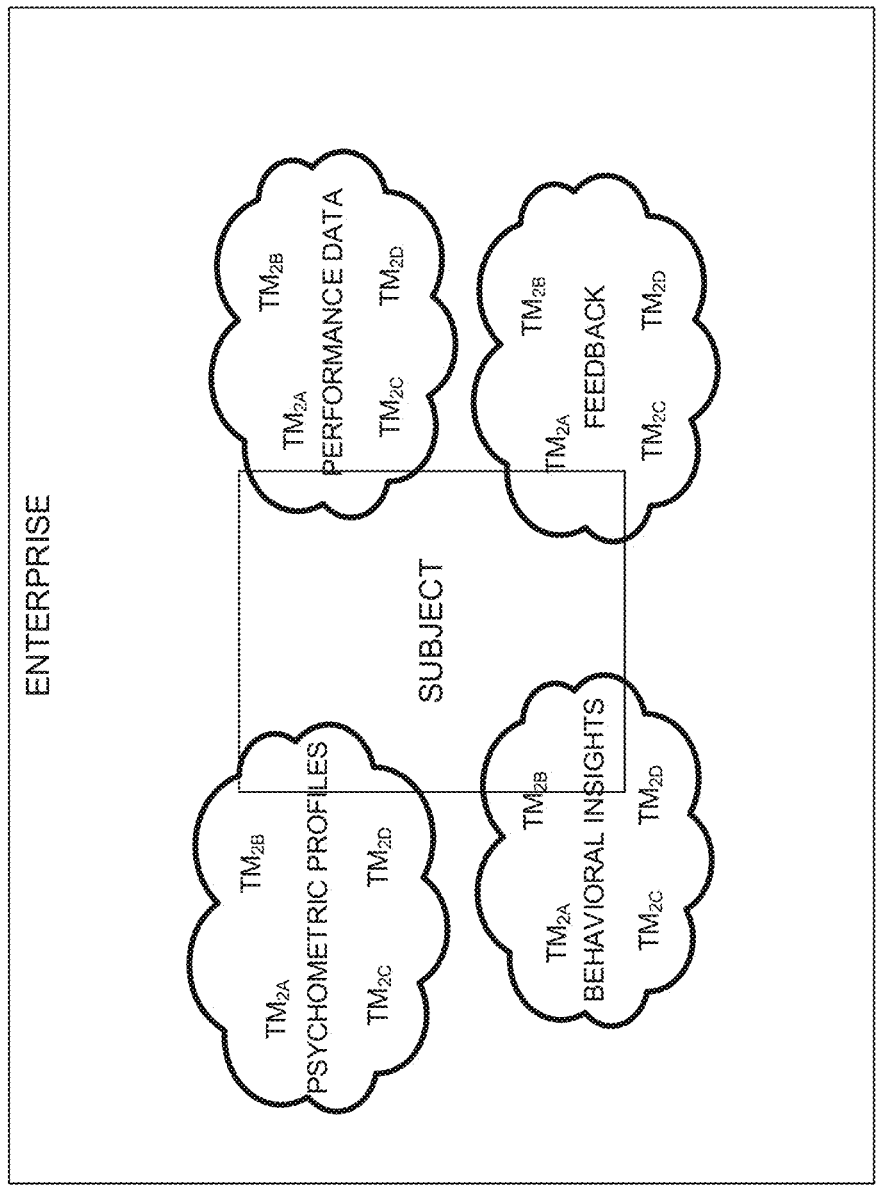
FIG. 9 illustrates exemplary distribution of behavioral insights within an organization, according to some embodiments of the present disclosure.

Referring now to FIG. 9, exemplary distribution of behavioral insights within an organization are illustrated, according to some embodiments of the present disclosure. In some embodiments, an organization may maintain databases with psychometric profiles, performance data, behavioral insights, and feedback. In some aspects, these databases may be maintained in groups or separately. In some implementations, the databases may be organized or categorized by subject, such as by person, team, or position, as non-limiting examples. In some aspects, the databases may be logically linked, which may allow for correlation between the data, such as by subject.

For example, the subject may comprise an individual, and her psychometric profile and behavioral insights may be compared to her performance and feedback. This may allow for an assessment of whether she is performing above or below expectations based on her behavioral insights. In some aspects, her performance may be compared to her feedback, which may provide insight as to how effective the feedback has been and whether her responses have been in line with expectations or predictions based on her psychometric profile and behavioral insight.

In some embodiments, there may exist an organization folder comprising of how she responds to different feedback, such as feedback tone, feedback type, or feedback mechanism, as non-limiting examples. In some implementations, this may provide effective information on what feedback works best, and what feedback to stay away from. For example, effective feedback may be labeled "positive responses" to indicate which feedback she responds to best, and ineffective feedback may be labeled "negative responses" to indicate the feedback did not cause a positive change.

As an illustrative example, a marketing person may be accustomed to receiving feedback in conjunction with his projects, and feedback given with projects may be overlooked or ignored unless it pertains directly to the project, such as requiring a rewrite of the text or an illustration change. In reviewing the marketing person's profile, there may be a note to discourage presenting feedback for projects. In some aspects, non-project feedback may be separated from project feedback or may be separately labeled, and the system may customize the feedback to the marketing person by providing non-project feedback in a distinct platform, on a delay, or other distinguishing method.

As another example, a professor may give her class a single final exam without any other tests during the year. Providing feedback only on the final exam likely causes anxiety among students as well as not allowing for improvement within the semester. The professor may require non-graded activities throughout the semester, which may provide opportunities for feedback.

One or both the system and the professor may have access to the behavior insights for each student. The professor may customize feedback based on the psychometric profiles, such as by having some in-person meetings with some, providing detailed comments to some, and providing high level assessments.

In some aspects, the system may recommend effective feedback styles and methods for each student. In some implementations, the system may accept standardized feedback from the professor and customize it when relayed to the students. For example, the professor may fill out the same form for all of her students, and the system may take the contents to customize it based on the student psychometric profiles. The customization may be based on general archetypes or it may be specific to each psychometric profile. The customization may comprise the delivery mechanism, the wording, or the timing of delivery as non-limiting examples.

Figure 10A:
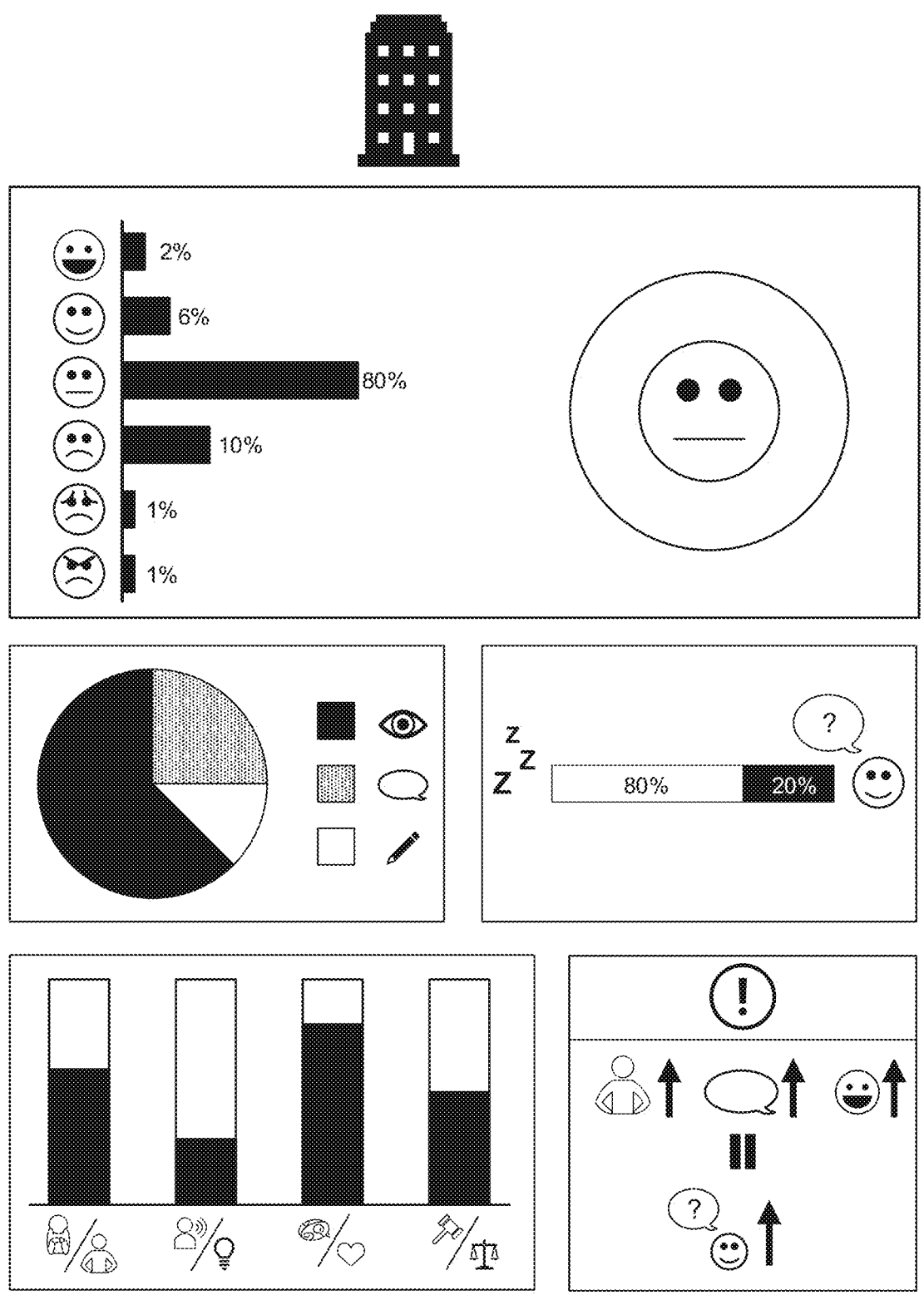
FIG. 10A illustrates an exemplary behavioral insight dashboard, according to some embodiments of the present disclosure.
Figure 10B:
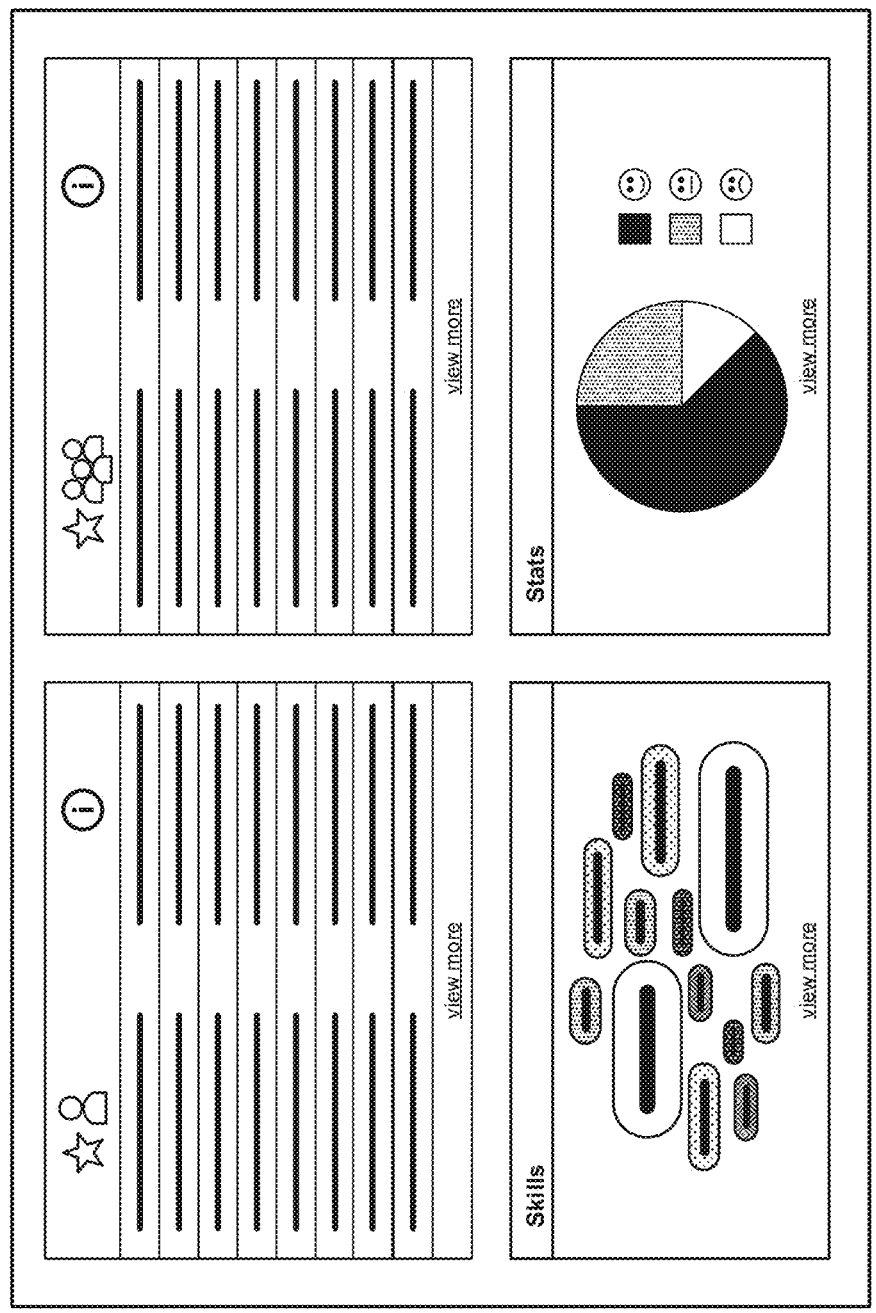
FIG. 10B illustrates an exemplary behavioral insight dashboard, according to some embodiments of the present disclosure.
Figure 10C:
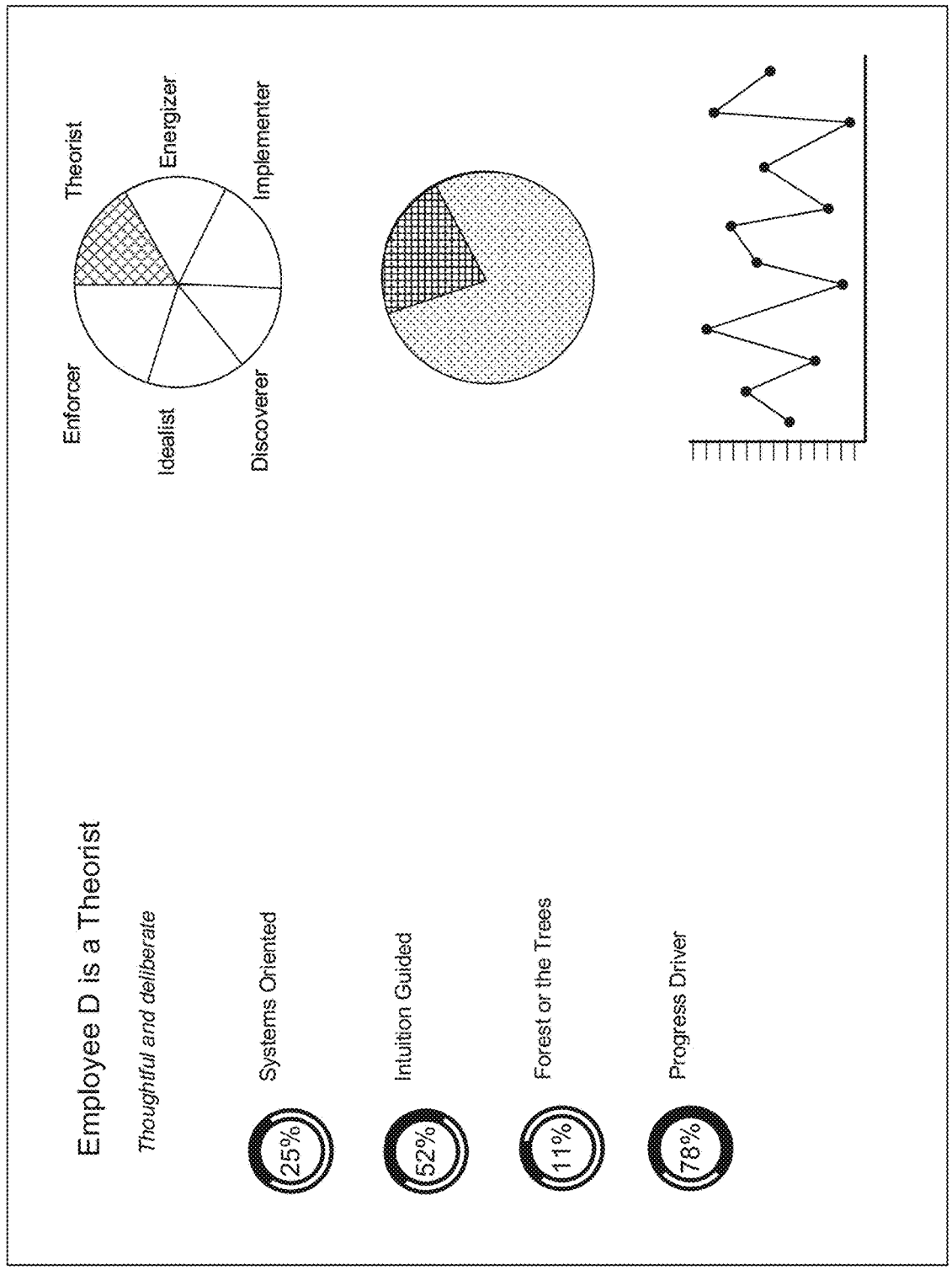
FIG. 10C illustrates an exemplary behavioral insight dashboard for an individual, according to some embodiments of the present disclosure.

Referring now to FIGS. 10A-10C, an exemplary behavioral insight dashboard is illustrated. In some embodiments, employees or team members may be ranked based on a variety of factors, which may be customized, such as by company, skill, department, or position, as non-limiting examples. In some aspects, the behavioral dashboard may allow for sorting and filtering, which may allow for viewing of highly-customized behavioral insights and psychometric profiles.

For example, a company may want to separately assess the behavioral insights for their java developers and their sales team. The relevant metrics for understanding their psychometric profiles and behavioral insights may be distinct. Engagement for java developers may comprise attending workshops and participation in projects, and engagement for a sales team may be visiting clients and attending client events. Accordingly, ranking employees in each department may be based on different factors and the most engaged or successful employee from each group may have very different psychometric profiles.

In some aspects, the board may analyze a specific person based on their individual group performance on a group to group basis. In some embodiments, the system may analyze an employee's performance in a group and determine whether or not they are exceeding expectations or not performing to the best of their abilities. In some implementations, the system may redistribute workload or participation by reorganizing the team makeup.

Figure 11:
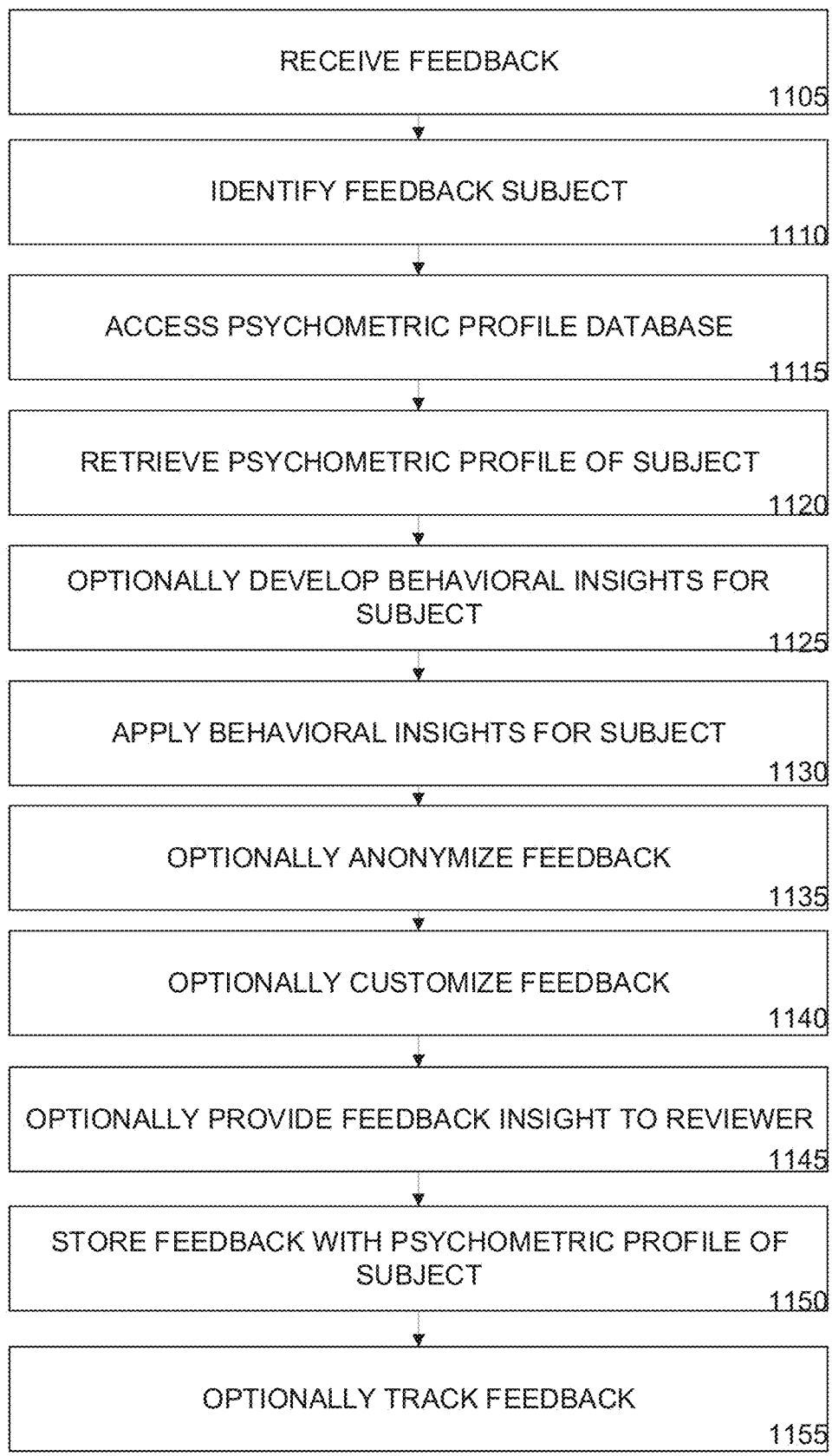
FIG. 11 illustrates exemplary method steps for receiving and providing feedback, according to some embodiments of the present disclosure.

Referring now to FIG. 11, an exemplary behavioral insight dashboard is illustrated. In some aspects, the behavioral insight dashboard may provide an aggregated understanding of the workforce for a company. In some embodiments, the workforce may comprise employees, contractors, vendors, managers, third party service providers, or other groups or individuals that may impact the success of the company, as non-limiting examples.

For example, the behavioral insight dashboard may provide historical data in graph form tracking the level of engagement of the workforce. The level of engagement may correlate to the overall climate, wherein high engagement of the work force may indicate that the employees are content and excited to be part of the company. Low engagement may indicate that the employees are unhappy or uninterested in the company, which may suggest they are likely to leave when they find another company that may provide more satisfaction.

In some embodiments, the system may request feedback about a particular meeting. In some implementations, participants may comment on what they liked and what they disliked. In some aspects, the system may facilitate participant or group discourse to determine whether there can be any improvements for future meetings. In some embodiments, the system may recommend certain actions for future meetings, such as allotting time for participants to prepare right before a meeting, or integrating another subject in the participant list.

Referring now to FIG. 10C, an exemplary behavioral insight dashboard for an individual is illustrated. In some aspects, behavioral insights may be presented as a combination of graphics, numbers, and text. In some embodiments, the behavioral insights may be presented in context of employment, wherein information is provided for both the individual and for those who may work with the individual.

In some implementations, the behavioral insight dashboard may present success predictions for various roles, such as within different company sizes, company stages, and management positions, as non-limiting examples. In some embodiments, the behavioral insight dashboard may logically interface with third party psychometric assessment platforms, wherein the behavioral insights may be based in part on data associated with the individual from the platforms. In some aspects, the behavioral insight dashboard may incorporate other attributes, such as interests, skills, aspirations, experience, performance data, and feedback data, as non-limiting examples.

In some embodiments, the behavioral insight dashboard may show subjects what aspects of their work behavior they need to work on, what they are succeeding at, setting personal goals for the subject, and creating milestones for the subject to achieve personal or professional goals. In some aspects, the behavioral insight dashboard may accept personal goals for individuals on their dashboards to improve specific behaviors set by an employer. In some embodiments, the system may track goals based on milestones and issue incentives set by the employer. In some implementations, the system may send notifications to users based on their progress after a certain amount of time allotted for each goal or performance review.

Referring now to FIG. 11, exemplary method steps for receiving and providing feedback are illustrated, according to some embodiments of the present disclosure. At 1105, feedback may be received. At 1110, the subject of the feedback may be identified. At 1115, the psychometric profile database may be accessed. At 1120, the psychometric profile of the subject may be retrieved. In some aspects, at 1125, behavioral insights of the subject may be developed, and at 1130, the behavioral insights of the subject may be applied.

In some embodiments, at 1135, the feedback may be anonymized. In some implementations, at 1140, the feedback may be customized, such as based on preferences, behavioral insights, or delivery mechanism, as non-limiting examples. In some aspects, at 1145, feedback insight may be provided to the reviewer. At 1150, the feedback may be stored with the psychometric profile of the subject. In some embodiments, at 1155, feedback may be tracked over time. For example, a manager may want to track feedback of her team, which may allow her to see if the team keeps receiving the same feedback or if the team was effectively receiving feedback and adjusting behavior.

Figure 12:
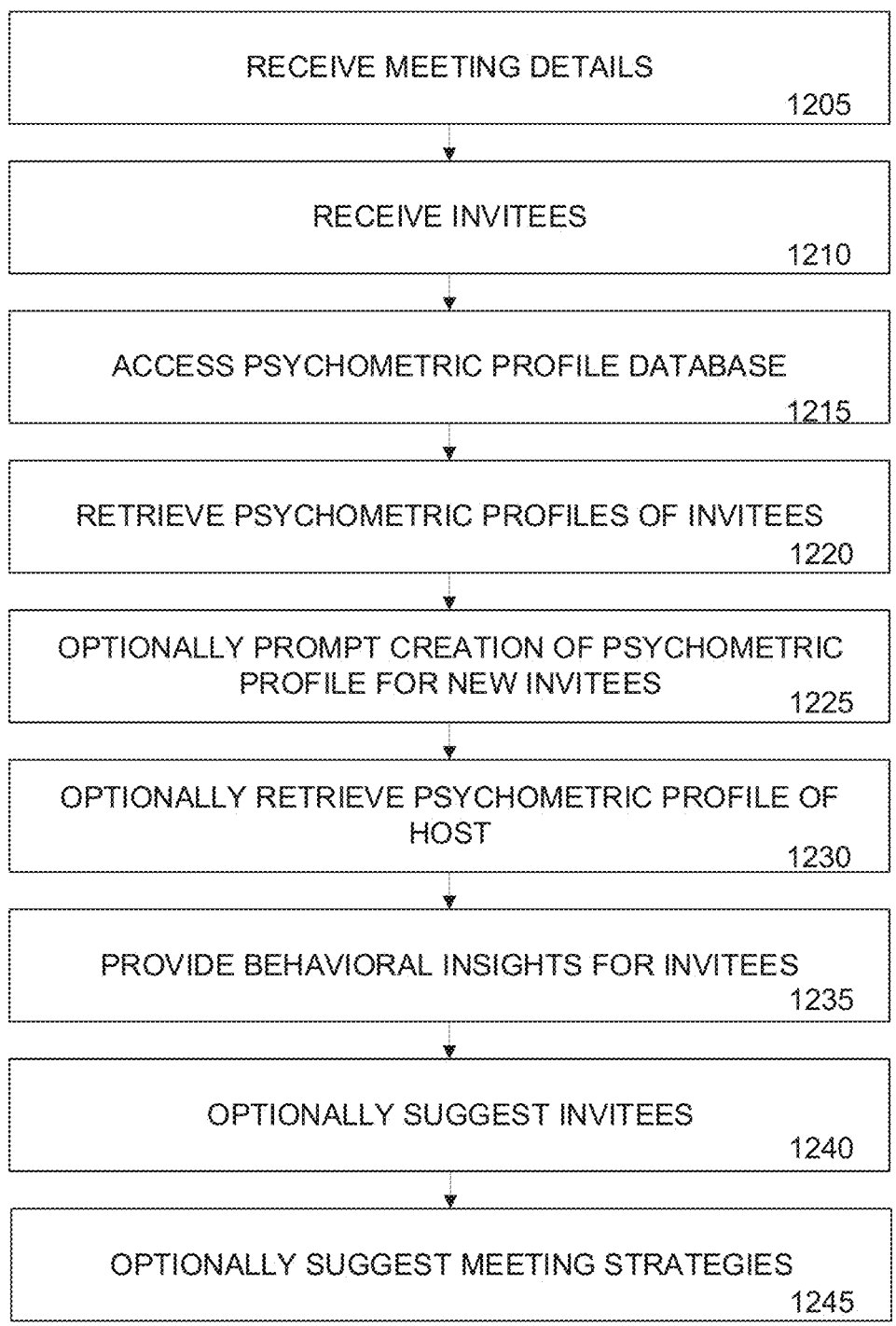
FIG. 12 illustrates exemplary method steps for providing behavioral insights for invitees, according to some embodiments of the present disclosure.

Referring now to FIG. 12, exemplary method steps for providing behavioral insights for invitees are illustrated. At 1205, meeting details may be received. At 1210, invitees may be received. At 1215, a psychometric profile database may be access. At 1220, psychometric profiles of invitees may be retrieved.

In some aspects, at 1225, creation of psychometric profiles for new invitees may be prompted. In some embodiments, at 1230, a psychometric profile of a host may be retrieved. At 1235, behavioral insights for the invitees may be provided, such as to the host. In some implementations, the presentation of the behavioral insights may be customized to the host, such as based on preference, the host psychometric profile, or organization policy, as non-limiting examples. In some aspects, at 1240, invitees may be suggested, such as those who may increase the effectiveness of the meeting. In some embodiments, at 1245, meeting strategies may be suggested.

Figure 13:
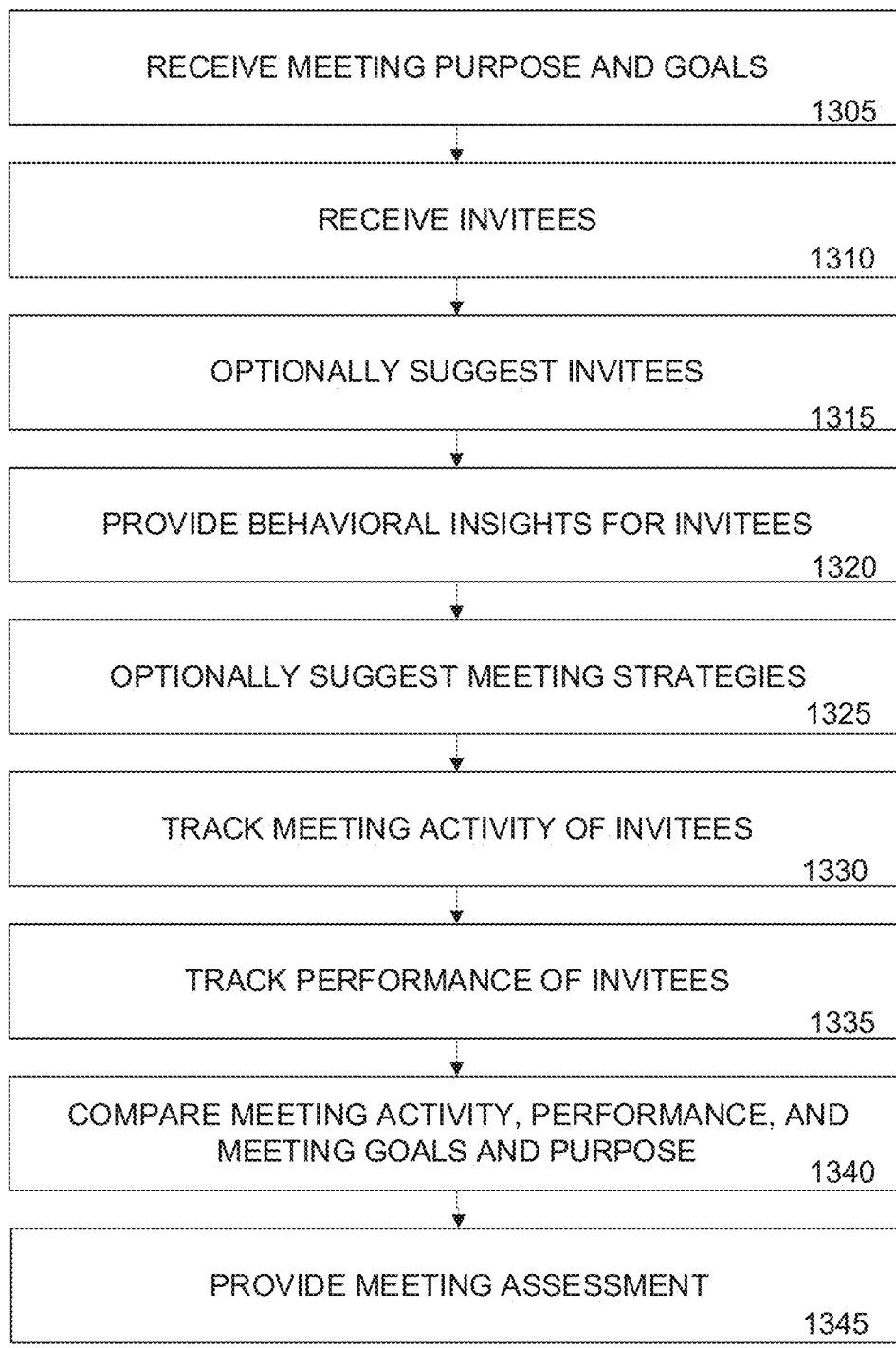
FIG. 13 illustrates exemplary method steps for tracking performance of invitees, according to some embodiments of the present disclosure.

Referring now to FIG. 13, exemplary method steps for tracking performance of invitees are illustrated. At 1305, meeting purpose and goals may be received. At 1310, invitees may be received. In some aspects, at 1315, invitees may be suggested. At 1320, behavioral insight for invitees may be provided, such as to the host. In some embodiments, at 1325, meeting strategies may be suggested, such as based on behavioral insight, meeting goals, or other meeting parameters, as non-limiting examples.

At 1330, meeting activity of invitees may be tracked. For example, a host may send emails with materials so the invitees may prepare for the meeting, and level of engagement may be tracked, such as when each invitee opened the email, whether an invitee opened the attachments, or whether an invitee clicked an embedded link to access the materials, as non-limiting examples. At 1335, performance of invitees may be tracked, wherein the performance parameters may be based on meeting purpose and goals, as a non-limiting example.

The performance parameters where the goal of the meeting may be to promote teamwork and collaboration may be different than where the goal of the meeting is to increase the passing rate for a certification exam. At 1340, meeting activity, performance, and meeting goals and purpose may be compared, and at 1345, a meeting assessment may be provided. In some aspects, tracking post-meeting performance may allow for the identification of trends and patterns associated with meeting strategies, hosts, invitees, or other meeting component, as non-limiting examples.

Figure 14:
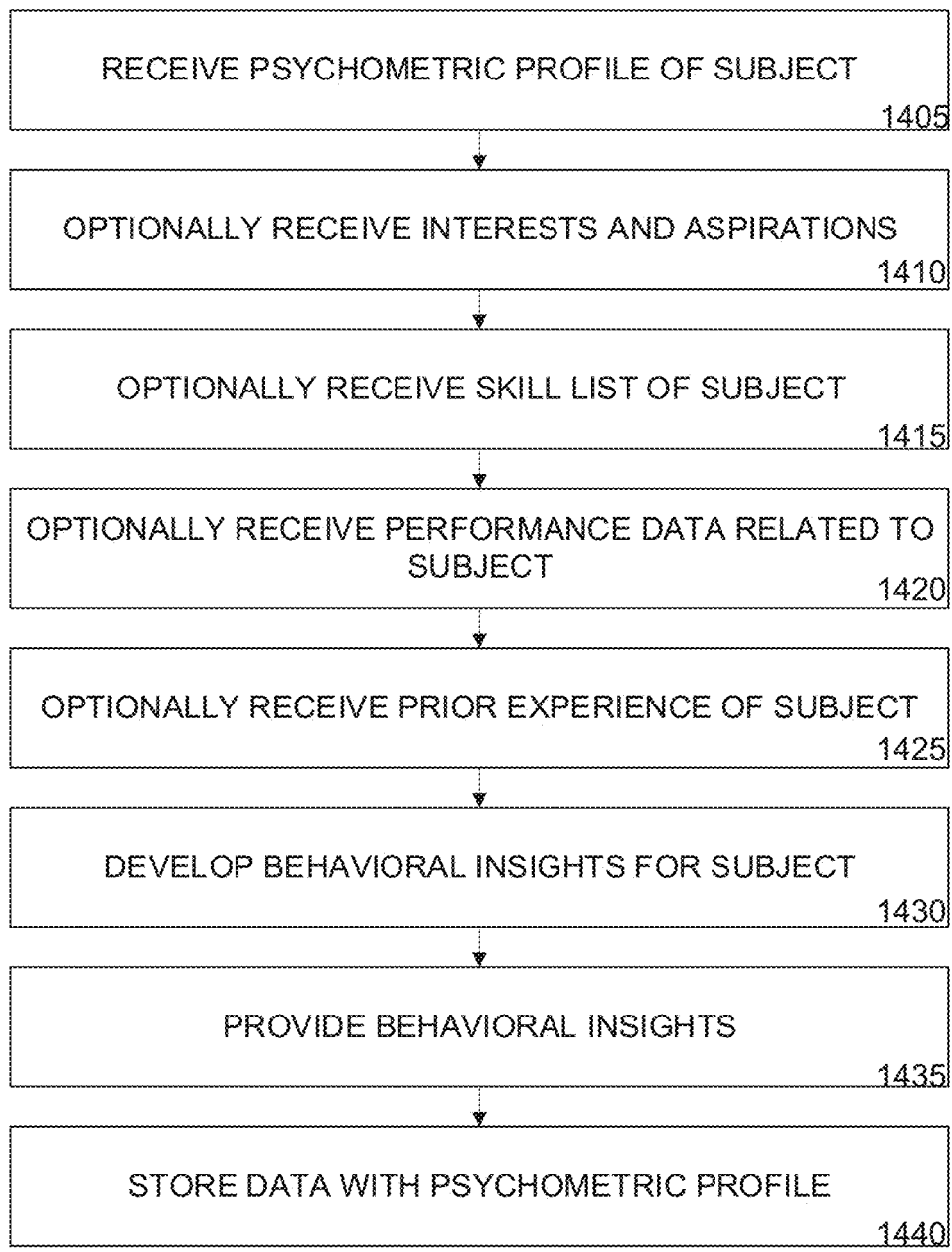
FIG. 14 illustrates exemplary method steps for developing behavioral insights, according to some embodiments of the present disclosure.

Referring now to FIG. 14, exemplary method steps for developing behavioral insights are illustrated. At 1405, a psychometric profile of a subject may be received. In some aspects, at 1410, interests and aspirations of the subject may be received. In some embodiments, at 1415, a skill list of the subject may be received. In some embodiments, at 1420, performance data related to a subject may be received. In some implementations, at 1425, prior experience of the subject may be received. At 1430, behavioral insights of the subject may be developed. At 1435, behavioral insights may be provided, such as to the subject, a manager, or employers, as non-limiting examples. At 1440, the collected data may be stored with psychometric profile.

Figure 15:
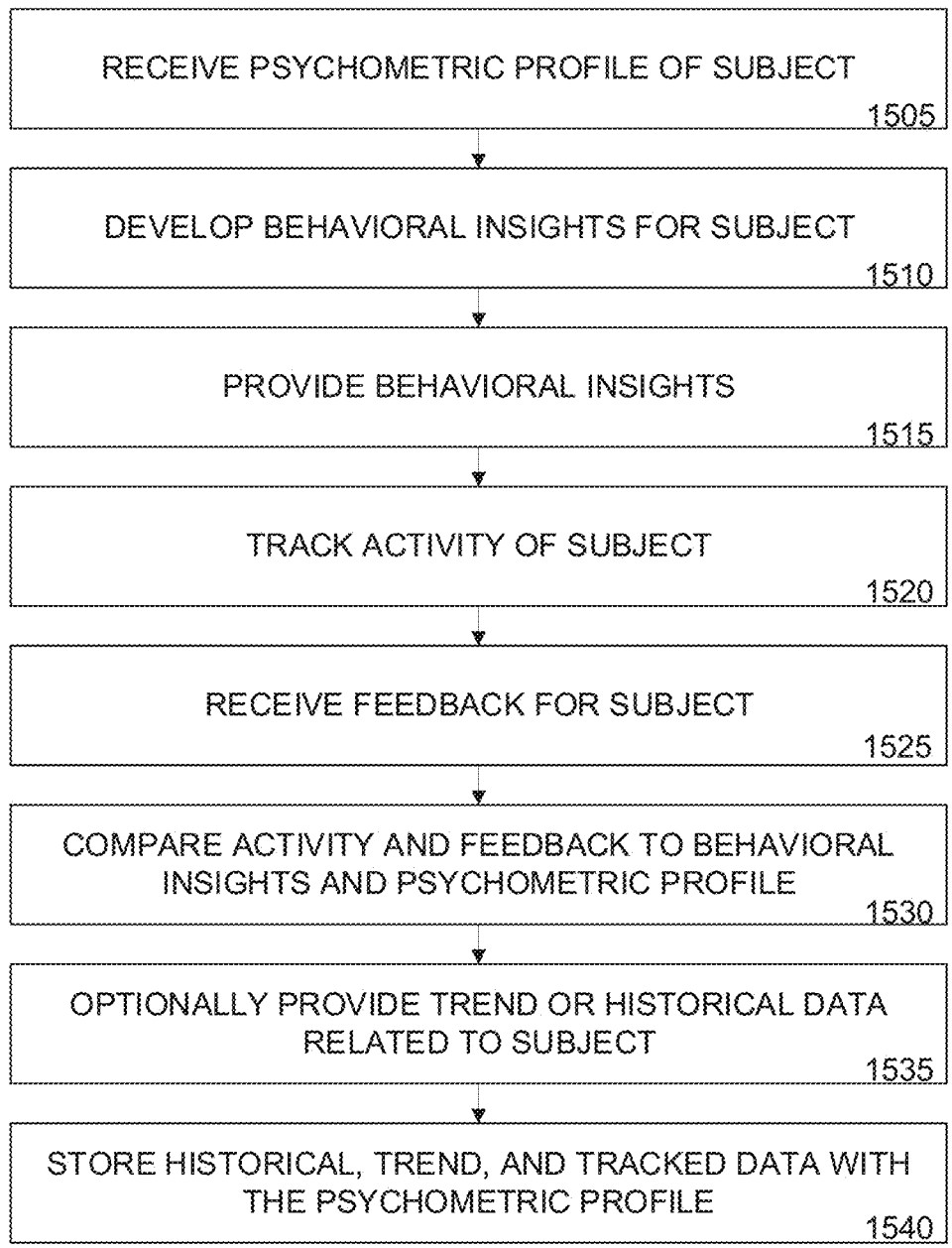
FIG. 15 illustrates exemplary method steps for tracking performance in context of behavioral insights, according to some embodiments of the present disclosure.

Referring now to FIG. 15, exemplary method steps for tracking performance in context of behavioral insights are illustrated. At 1505, a psychometric profile of a subject may be received. At 1510, behavioral insights of the subject may be developed. At 1515, behavioral insights may be provided, such as through a dashboard. At 1520, the activity of the subject may be tracked. In some aspects, at 1525, feedback for the subject may be received. At 1530, the activity and feedback may be compared to the behavioral insights and psychometric profile. In some embodiments, at 1535, trend and historical data related to the subject may be provided. At 1540, historical, trend, and tracked data related to the subject may be stored with the psychometric profile.

Figure 16:
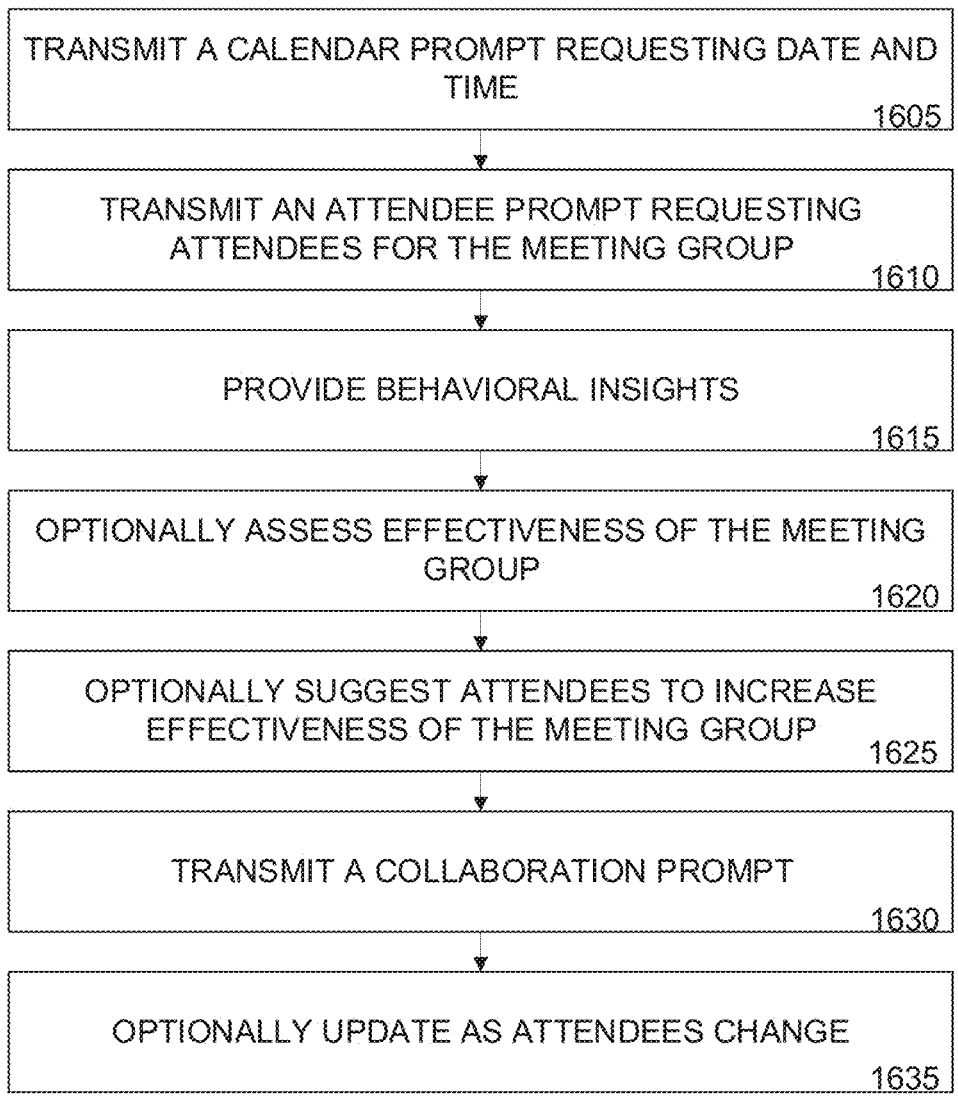
FIG. 16 illustrates exemplary method steps for providing behavioral insights for a calendar invitation, according to some embodiments of the present disclosure.

Referring now to FIG. 16, method steps for providing behavioral insights for a calendar invitation are illustrated. At 1605, a calendar prompt requesting date and time may be transmitted. At 1610, an attendee prompt requesting attendees may be transmitted. At 1615, behavioral insights may be provided. In some aspects, at 1620, effectiveness of the meeting group may be assessed. In some embodiments, at 1625, attendees may be suggested that may increase the effectiveness of the meeting group. At 1630, a collaboration prompt may be transmitted, which may request pre-meeting information, such as expectations, agenda, preparation materials, or preparation tasks. In some aspects, at 1635, behavioral insights may be updated as attendees change. In some embodiments, the update may occur as additional attendees are requested. In some implementations, the update may occur as attendees confirm or reject the invitation. This may dynamically maintain accuracy of the behavioral insights.

Figure 17:
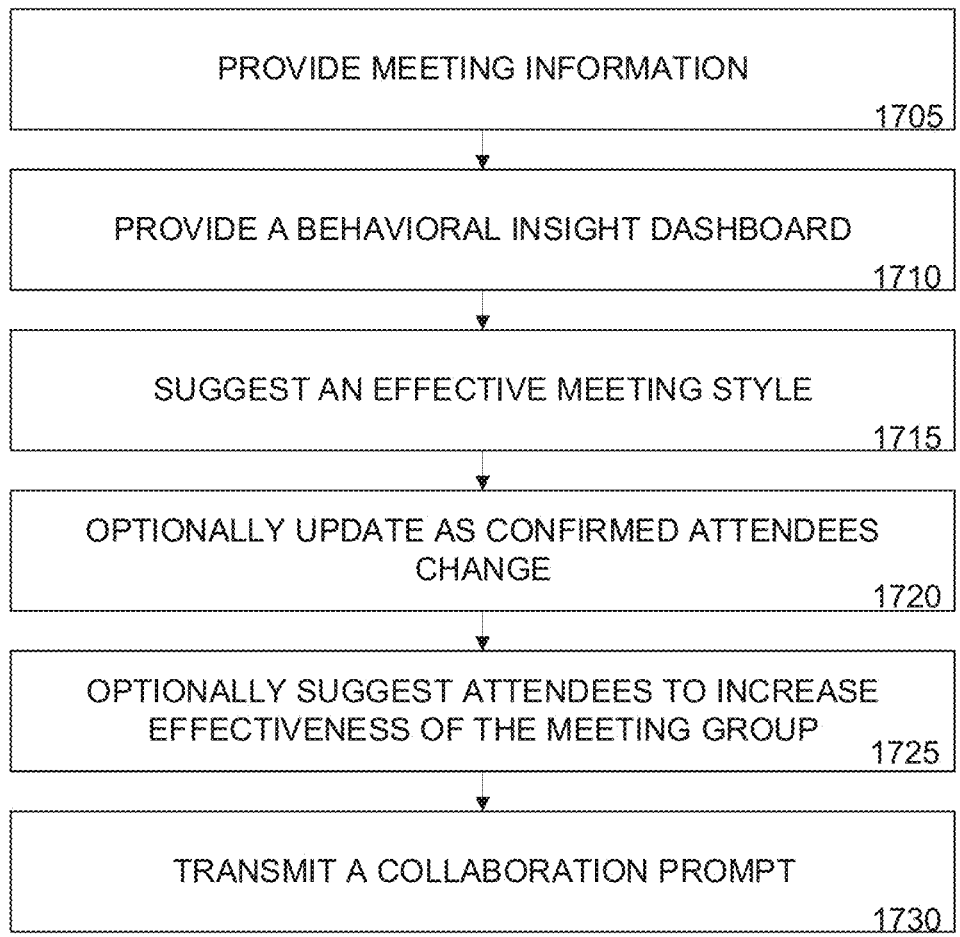
FIG. 17 illustrates exemplary method steps for providing behavioral insights for a meeting, according to some embodiments of the present disclosure.

Referring now to FIG. 17, exemplary method steps for providing behavioral insights for a meeting are illustrated. At 1705, meeting information may be provided, wherein the meeting information may comprise date, time, content, and attendees, as non-limiting examples. At 1710, a behavioral insight dashboard may be provided, which may provide behavioral insights for one or more attendees, participants, hosts, or meeting group. At 1715, an effective meeting style may be suggested, wherein the effective meeting style may be based on behavioral insights. In some aspects, at 1720, as confirmed attendees change, behavioral insights may be updated. In some embodiments, at 1725, attendees that may increase effectiveness of the meeting group may be suggested. At 1730, a collaboration prompt may be transmitted, which may allow for sharing of notes, feedback, or tasks, as non-limiting examples.

Figure 18:
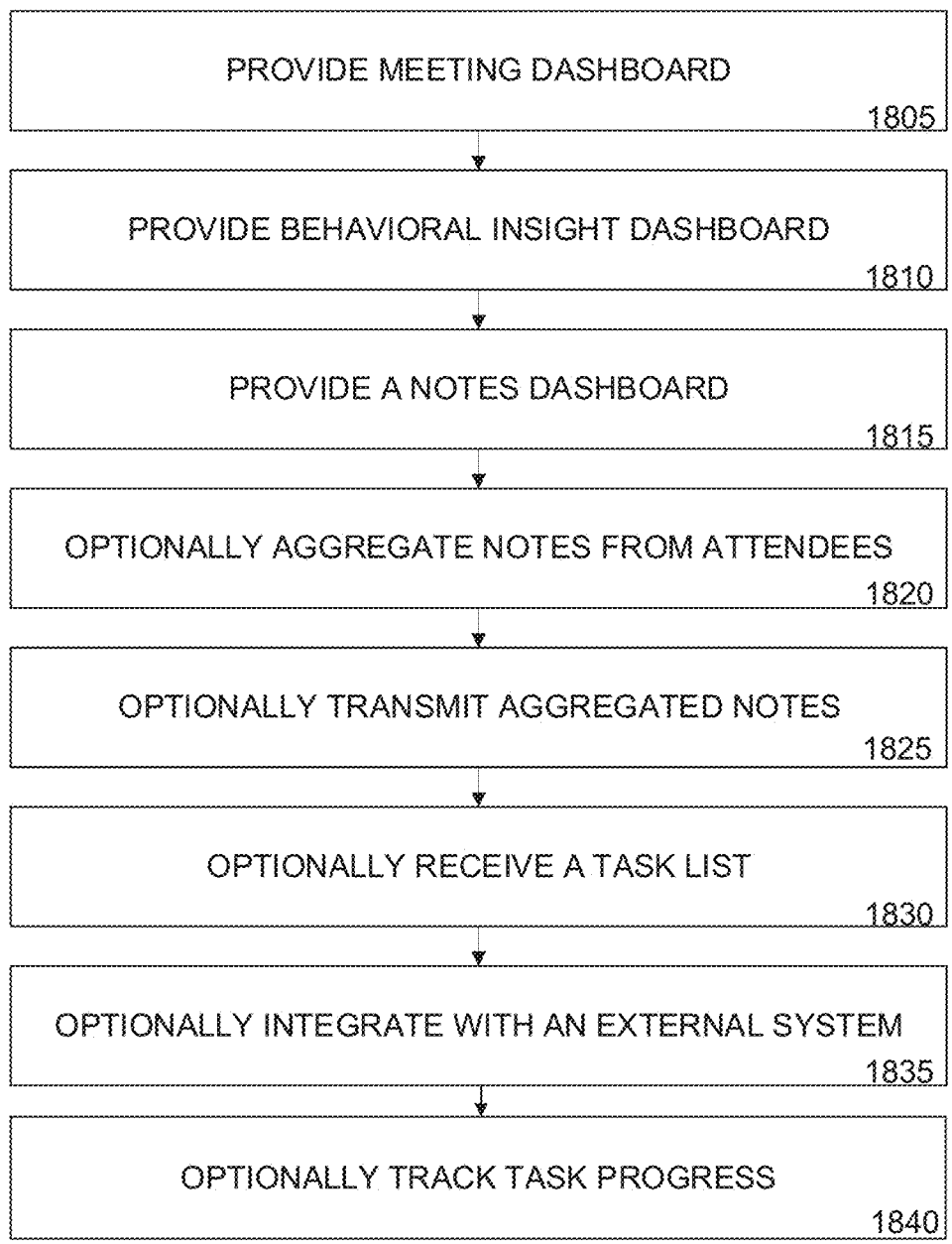
FIG. 18 illustrates exemplary method steps for providing behavioral insights for a meeting, according to some embodiments of the present disclosure.

Referring now to FIG. 18, exemplary method steps for providing behavioral insights for a meeting are illustrated. At 1805, a meeting dashboard may be provided. At 1810, a behavioral insight dashboard may be provided, such as to an attendee or manager. At 1815, a notes dashboard may be provided. In some aspects, at 1820, notes from attendees may be aggregated. In some embodiments, at 1825, aggregated notes may be transmitted, such as to attendees or management. In some implementations, notes, meeting recordings, populated tasks, and task assignees may be attached to a calendar, wherein the meeting information may be accessed at a later date by someone that may have access.

In some embodiments, at 1830, a task list may be received, wherein the attendees may develop tasks during the meeting. In some aspects, at 1835, the behavioral insight dashboard may be integrated with an external system, such as a project management platform, a communications platform, or a productivity platform. In some implementations, at 1840, task progress may be tracked. For example, if the task is broken into parts and each part is assigned to different individuals, progress of each individual may be tracked. In some aspects, behavioral insights may be combined with the task progress tracking, which may allow for realistic expectations for each of the individual or task team.

Figure 19:
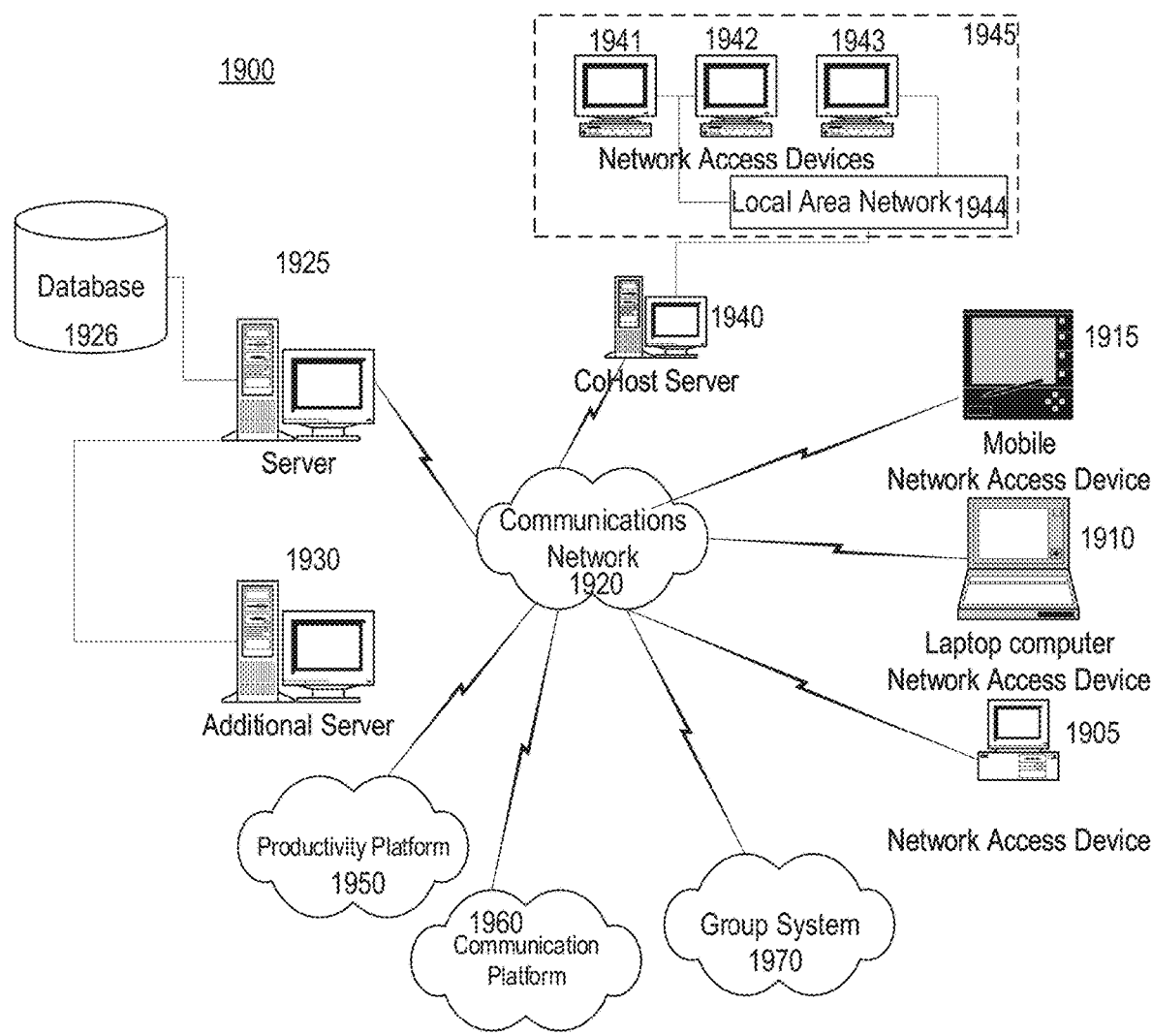
FIG. 19 illustrates an exemplary block diagram of an exemplary embodiment of a mobile device.

Referring now to FIG. 19, an exemplary processing and interface system 1900 is illustrated. In some aspects, access devices 1915, 1910, 1905, such as a paired portable device 1915 or laptop computer 1910 may be able to communicate with an external server 1925 though a communications network 1920. The external server 1925 may be in logical communication with a database 1926, which may comprise data related to identification information and associated profile information. In some embodiments, the server 1925 may be in logical communication with an additional server 1930, which may comprise supplemental processing capabilities.

In some aspects, the server 1925 and access devices 1905, 1910, 1915 may be able to communicate with a cohost server 1940 through a communications network 1920. The cohost server 1940 may be in logical communication with an internal network 1945 comprising network access devices 1941, 1942, 1943 and a local area network 1944. For example, the cohost server 1940 may comprise a payment service, such as PayPal or a social network, such as Facebook or LinkedIn.

In some embodiments, the behavioral insight system may integrate or communicate with external systems, such a productivity platform 1950, communication platform 1960, or group system 1970. For example, a communication platform 1960 may allow for instant messaging and provide behavioral insights in real time during communication. As another example, group systems 1970 may comprise enterprise systems, such as within companies, educational institutions, and clubs.

Figure 20:
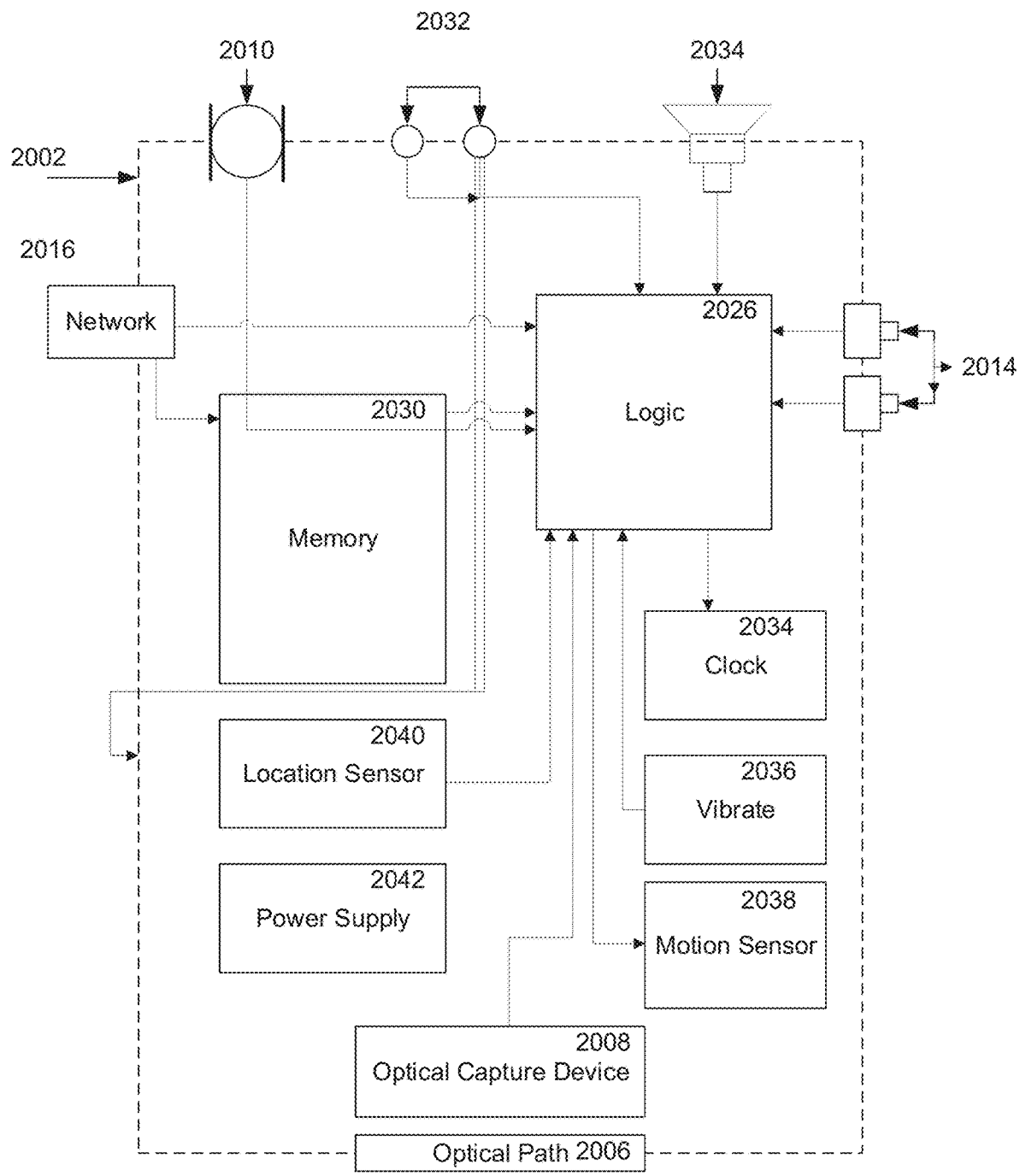
FIG. 20 illustrates an exemplary processing and interface system.

Referring now to FIG. 20, an exemplary block diagram of an exemplary embodiment of a mobile device 2002 is illustrated. The mobile device 2002 may comprise an optical capture device 2008, which may capture an image and convert it to machine-compatible data, and an optical path 2006, typically a lens, an aperture, or an image conduit to convey the image from the rendered document to the optical capture device 2008. The optical capture device 2008 may incorporate a Charge-Coupled Device (CCD), a Complementary Metal Oxide Semiconductor (CMOS) imaging device, or an optical sensor of another type.

In some embodiments, the mobile device 2002 may comprise a microphone 2010, wherein the microphone 2010 and associated circuitry may convert the sound of the environment, including spoken words, into machine-compatible signals. Input facilities 2014 may exist in the form of buttons, scroll-wheels, or other tactile sensors such as touch-pads. In some embodiments, input facilities 2014 may include a touchscreen display. Visual feedback 2032 to the user may occur through a visual display, touchscreen display, or indicator lights. Audible feedback 2034 may be transmitted through a loudspeaker or other audio transducer. Tactile feedback may be provided through a vibration module 2036.

In some aspects, the mobile device 2002 may comprise a motion sensor 2038, wherein the motion sensor 2038 and associated circuitry may convert the motion of the mobile device 2002 into machine-compatible signals. For example, the motion sensor 2038 may comprise an accelerometer, which may be used to sense measurable physical acceleration, orientation, vibration, and other movements. In some embodiments, the motion sensor 2038 may comprise a gyroscope or other device to sense different motions.

In some implementations, the mobile device 2002 may comprise a location sensor 2040, wherein the location sensor 2040 and associated circuitry may be used to determine the location of the device. The location sensor 2040 may detect Global Position System (GPS) radio signals from satellites or may also use assisted GPS where the mobile device may use a cellular network to decrease the time necessary to determine location. In some embodiments, the location sensor 2040 may use radio waves to determine the distance from known radio sources such as cellular towers to determine the location of the mobile device 2002. In some embodiments these radio signals may be used in addition to and/or in conjunction with GPS.

In some aspects, the mobile device 2002 may comprise a logic module 2026, which may place the components of the mobile device 2002 into electrical and logical communication. The electrical and logical communication may allow the components to interact. Accordingly, in some embodiments, the received signals from the components may be processed into different formats and/or interpretations to allow for the logical communication. The logic module 2026 may be operable to read and write data and program instructions stored in associated storage 2030, such as RAM, ROM, flash, or other suitable memory. In some aspects, the logic module 2026 may read a time signal from the clock unit 2028. In some embodiments, the mobile device 2002 may comprise an on-board power supply 2042. In some embodiments, the mobile device 2002 may be powered from a tethered connection to another device, such as a Universal Serial Bus (USB) connection.

In some implementations, the mobile device 2002 may comprise a network interface 2020, which may allow the mobile device 2002 to communicate and/or receive data to a network and/or an associated computing device. The network interface 2016 may provide two-way data communication. For example, the network interface 2016 may operate according to an internet protocol. As another example, the network interface 2016 may comprise a local area network (LAN) card, which may allow a data communication connection to a compatible LAN. As another example, the network interface 2016 may comprise a cellular antenna and associated circuitry, which may allow the mobile device to communicate over standard wireless data communication networks. In some implementations, the network interface 2016 may comprise a Universal Serial Bus (USB) to supply power or transmit data. In some embodiments, other wireless links known to those skilled in the art may also be implemented.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A computer-implemented method for providing a meeting interface comprising:
    transmitting a calendar prompt requesting at least one date and time for a meeting received from one or more of a productivity platform, communication platform, or group system;
    transmitting an attendee prompt requesting at least one requested attendee for a meeting group received from one or more of the productivity platform, communication platform, or group system;
    receiving from a first server psychometric profiles and one or more interest lists and skill lists for each of the at least one requested attendee;
    building through the first server or a second server a behavioral insight dashboard comprising a visualization of behavioral insights wherein behavioral insights for one or more of the meeting group and the at least one requested attendee are based on an assessment of the psychometric profiles and one or more interest lists and skill lists;
    transmitting to at least one access device the behavioral insight dashboard through a meeting interface providing behavioral insights for one or more of the at least one requested attendee and the meeting group, wherein behavior insights are based on at least an assessment of a psychometric profile of the at least one attendee and the meeting group, wherein the meeting interface is accessible by a user; and
    assessing through the first server or the second server an effectiveness of the meeting group based on behavioral insights of the meeting group; and
    suggesting compatible attendees based on the assessing, wherein compatible attendees increase the effectiveness of the meeting group, wherein suggesting occurs through the at least one access device; and
    transmitting a collaboration prompt to at least a portion of the meeting group through the at least one access device, wherein the collaboration prompt invites the portion of the meeting group to provide meeting preparation information.

2. The computer-implemented method of claim 1, wherein the behavioral insight dashboard is updated in real time as requested attendees are added to the meeting group.

3. The computer-implemented method of claim 1, wherein the behavioral insights provide guidance on how to effectively conduct the meeting based on predefined parameters.

4. The computer-implemented method of claim 1, further comprising recommending a change in meeting group based on comparison.

5. The computer-implemented method of claim 1, further comprising integrating with an external calendaring system, wherein one or both of the at least one date and time and the at least one requested attendee are transmitted to the external calendaring system.

6. A computer-implemented method for providing a meeting interface comprising:

provided meeting information comprising at least date information, time information, potential attendees, and confirmed attendees for a meeting, wherein meeting information is received from one or more of a productivity platform, communication platform, or group system;

receiving from a first server psychometric profiles and one or more interest lists and skill lists for one or more confirmed attendees and potential attendees;

building through the first server or a second server a behavioral insight dashboard on a meeting interface, wherein the behavioral insight dashboard comprises a visualization of subject behavioral insights wherein subject behavioral insights for the potential attendees and confirmed attendees are based on an assessment of the psychometric profiles and one or more interest lists and skill lists; and providing the behavioral insight dashboard through the meeting interface, wherein the meeting interface is accessible by a user through at least one access device, and wherein the behavioral insight dashboard updates in real time as potential attendees and confirmed attendees change.

7. The computer-implemented method of claim 6, further comprising suggesting an effective meeting style based on behavioral insights.

8. The computer-implemented method of claim 7, wherein behavioral insights determine comprehension styles of confirmed attendees, and the effective meeting style is based at least in part on comprehension styles.

9. A computer-implemented method for providing a meeting interface comprising:

receiving from a first server psychometric profiles and one or more interest lists and skill lists for confirmed attendees;

building through the first server or a second server a behavioral insight dashboard on a meeting dashboard, wherein the behavioral insight dashboard comprises a visualization of subject behavioral insights wherein subject behavioral insights for confirmed attendees are based on an assessment of the psychometric profiles and one or more interest lists and skill lists, wherein confirmed attendees are identified through one or more of a productivity platform, communication platform, or group system;

providing to at least one access device the meeting dashboard with the behavioral insight dashboard comprising at least date information, time information, and a meeting group for a meeting, wherein the meeting group comprises confirmed attendees; and providing a notes dashboard to the at least one access device configured to aggregate meeting notes from at least a portion of confirmed attendees;

receiving a set of meeting tasks from the at least one access device, wherein the set of meeting tasks comprises a task, a task team, and a due date; and transmitting the set of meeting tasks to at least a portion of the meeting group to the at least one access device.

10. The computer-implemented method of claim 9, further comprising receiving task progress from at least a portion of the task team; and providing task progression based on received task progress.

11. The computer-implemented method of claim 9, further comprising:

integrating with an external task management platform; and transmitting the set of meeting tasks to the external task management platform.

12. The computer-implemented method of claim 9, further comprising receiving feedback from one or more confirmed attendees, wherein feedback relates to one or both at least a portion of the meeting group or the meeting.

13. The computer-implemented method of claim 12, further comprising providing feedback to at least a portion of the meeting group.

14. The computer-implemented method of claim 9, further comprising receiving a recording of the meeting; and providing the recording of the meeting to at least a portion of the meeting group.

15. The computer-implemented method of claim 14, further comprising storing the recording with a calendar dashboard.

16. The computer-implemented method of claim 9, further comprising transmitting aggregated notes to at least a portion of the meeting group.

* * * * *